US012030081B2

(12) United States Patent
Park et al.

(10) Patent No.: US 12,030,081 B2
(45) Date of Patent: Jul. 9, 2024

(54) LARGE LATERAL SCALE TWO-DIMENSIONAL MATERIALS AND OTHER THIN FILMS, AND ASSOCIATED SYSTEMS AND METHODS

(71) Applicant: The University of Chicago, Chicago, IL (US)

(72) Inventors: Jiwoong Park, Chicago, IL (US); Yu Zhong, Chicago, IL (US); Baorui Cheng, Chicago, IL (US)

(73) Assignee: The University of Chicago, Chicago, IL (US)

( * ) Notice: Subject to any disclaimer, the term of this patent is extended or adjusted under 35 U.S.C. 154(b) by 0 days.

(21) Appl. No.: 17/767,125

(22) PCT Filed: Oct. 6, 2020

(86) PCT No.: PCT/US2020/054378
§ 371 (c)(1),
(2) Date: Apr. 7, 2022

(87) PCT Pub. No.: WO2021/071824
PCT Pub. Date: Apr. 15, 2021

(65) Prior Publication Data
US 2022/0388026 A1 Dec. 8, 2022

Related U.S. Application Data

(60) Provisional application No. 62/911,563, filed on Oct. 7, 2019.

(51) Int. Cl.
*B05D 1/20* (2006.01)
*B05D 1/18* (2006.01)

(52) U.S. Cl.
CPC ............... *B05D 1/185* (2013.01); *B05D 1/20* (2013.01)

(58) Field of Classification Search
CPC ................................. B05D 1/185; B05D 1/20
See application file for complete search history.

(56) References Cited

U.S. PATENT DOCUMENTS 3,767,737 A 10/1973 Lundstrom
4,155,793 A 5/1979 Salemme et al.
(Continued)

FOREIGN PATENT DOCUMENTS

EP 0 369 713 A2 5/1990
EP 0369713 A2 * 5/1990 ............. B01D 69/12
(Continued)

OTHER PUBLICATIONS

Zhong et al., Wafer-scale synthesis of monolayer two-dimensional porphyrin polymers for hybrid superlattices. Science. Dec. 13, 2019;366(6471):1379-1384. doi: 10.1126/science.aax9385. Epub Nov. 7, 2019.
(Continued)

*Primary Examiner* — Hai Y Zhang
(74) *Attorney, Agent, or Firm* — Wolf, Greenfield & Sacks, P.C.

(57) ABSTRACT

Disclosed herein are inventive methods of making thin films, inventive thin films, and inventive articles and systems comprising thin films. Certain embodiments are related to methods of making thin films in which reagents are arranged within a first phase and a second phase such that at least one reagent reacts to form a thin film proximate to the interface between the first phase and the second phase. Thin films (including two-dimensional materials) disclosed herein can have one or more of a variety of beneficial properties including large lateral dimension(s), lateral continuity, high mechanical strength, consistent spatial composition, and/or consistent thickness. In accordance with certain embodiments, thin films disclosed herein can be combined to form a variety of inventive multi-layer articles,
(Continued)

including multi-layer articles comprising a combination of thin films having different compositions that interact with each other via van der Waals forces.

21 Claims, 28 Drawing Sheets

(56) References Cited

U.S. PATENT DOCUMENTS

| | | | |
|---|---|---|---|
| 4,917,800 A | 4/1990 | Lonsdale et al. | |
| 5,196,257 A | 3/1993 | Barraud et al. | |
| 5,661,092 A | 8/1997 | Koberstein et al. | |
| 5,795,699 A | 8/1998 | Zhou et al. | |
| 5,970,381 A | 10/1999 | Ohno et al. | |
| 6,121,075 A | 9/2000 | Yamashita | |
| 6,287,928 B1 | 9/2001 | Yamashita | |
| 6,541,309 B2 | 4/2003 | Chen | |
| 6,635,494 B2 | 10/2003 | Yamashita | |
| 6,798,003 B2 | 9/2004 | Li et al. | |
| 6,864,192 B1 | 3/2005 | Liou et al. | |
| 7,803,669 B2 | 9/2010 | Cho et al. | |
| 2002/0172064 A1 | 11/2002 | Chen | |
| 2006/0180529 A1* | 8/2006 | Barbera-Guillem | C12M 23/16 210/150 |
| 2017/0028433 A1 | 2/2017 | Huang et al. | |
| 2018/0207591 A1* | 7/2018 | Yu | B01D 67/0088 |

FOREIGN PATENT DOCUMENTS

| | | |
|---|---|---|
| EP | 0 386 962 A2 | 9/1990 |
| EP | 0 474 533 A1 | 3/1992 |
| WO | WO 01/88025 A1 | 11/2001 |
| WO | WO 2013/078464 A1 | 5/2013 |
| WO | WO 2016/044938 A1 | 3/2016 |

OTHER PUBLICATIONS

Bauer et al., Synthesis of free-standing, monolayered organometallic sheets at the air/water interface. Angew Chem Int Ed Engl. Aug. 16, 2011;50(34):7879-84. doi: 10.1002/anie.201100669. Epub Jul. 1, 2011.

Colson et al., Rationally synthesized two-dimensional polymers. Nat Chem. Jun. 2013;5(6):453-65. doi: 10.1038/nchem.1628. Epub May 12, 2013.

Payamyar et al., Two-dimensional polymers: concepts and perspectives. Chem Commun (Camb). Jan. 4, 2016;52(1):18-34. doi: 10.1039/c5cc07381b.

Perepichka et al., Chemistry. Extending polymer conjugation into the second dimension. Science. Jan. 9, 2009;323(5911):216-7. doi: 10.1126/science.1165429.

Servalli et al., Synthetic Two-Dimensional Polymers. Annu Rev Mater Res. Mar. 2017;47:361-89.

Invitation to Pay Additional Fees for International Application No. PCT/US2020/054378 mailed Feb. 4, 2021.

International Search Report and Written Opinion for International Application No. PCT/US2020/054378 mailed Mar. 26, 2021.

International Preliminary Report on Patentability for International Application No. PCT/US2020/054378 mailed Apr. 21, 2022.

[No Author Listed], Langmuir-Blodgett trough. Wikipedia article. https://en.wikipedia.org/wiki/Langmuir-Blodgett_trough [last accessed Aug. 29, 2019].

Chung, A Review of Microporous Composite Polymeric Membrane Technology for Air-Separation. Polym Polym Compos. Jan. 1996;4(4):269-83.

Grunfeld, A modular multifunctional Langmuir-Blodgett trough. Rev Sci Instrum. 1993;64(2):548-55.

Nakamae et al., Surface studies on the ultrathin membrane prepared by spreading the polymer solution on a water surface. J Membr Sci. Apr. 1992;69(1/2):121-9.

* cited by examiner

LARGE LATERAL SCALE TWO-DIMENSIONAL MATERIALS AND OTHER THIN FILMS, AND ASSOCIATED SYSTEMS AND METHODS

RELATED APPLICATIONS

This application is a national stage filing under 35 U.S.C. § 371 of International Application No. PCT/US2020/054378, filed Oct. 6, 2020, and entitled "Large Lateral Scale Two-Dimensional Materials and Other Thin Films, and Associated Systems and Methods", which claims priority under 35 U.S.C. § 119(e) to U.S. Provisional Application No. 62/911,563, filed Oct. 7, 2019, and entitled "Large Lateral Scale Two-Dimensional Materials and Other Thin Films, and Associated Systems and Methods," each of which is incorporated herein by reference in its entirety for all purposes.

GOVERNMENT SPONSORSHIP

This invention was made with government support under grants FA9550-16-1-0347, FA9550-16-1-0031 and FA9550-18-1-0480 awarded by the United States Air Force, Air Force Office of Scientific Research, and grants DMR1420709 and ECCS1542205 awarded by the National Science Foundation. The government has certain rights in the invention.

TECHNICAL FIELD

Thin films, including two-dimensional materials, and associated systems and methods are generally described.

BACKGROUND

Large-scale thin films are useful in a variety of applications. Langmuir-Blodgett assembly is one method for forming large-scale thin films. In one such process, a thin film is formed by dipping a coated solid substrate into a water bath, arranging a layer of amphiphilic material at the interface between the water in the bath and the air over the bath, and subsequently removing the substrate from the bath such that the amphiphilic materials coats the substrate and forms a thin film.

The present inventors have recognized that Langmuir-Blodgett assembly has a number of limitations that limit its usefulness for many applications.

SUMMARY

Disclosed herein are inventive methods of making thin films, inventive thin films, and inventive articles and systems comprising thin films. The subject matter of the present invention involves, in some cases, interrelated products, alternative solutions to a particular problem, and/or a plurality of different uses of one or more systems and/or articles.

One aspect of the present disclosure is related to methods of making thin films. In some embodiments, the method comprises delivering a first reagent to an interface between a first liquid phase and a second liquid phase such that the first reagent does not dissolve within the first liquid phase, and the first reagent reacts to form a thin film via interaction with a second reagent.

Another aspect of the present disclosure is related to monolayers and other thin films. In some embodiments, a polymeric monolayer comprises a minimum lateral dimension of at least 5 centimeters, wherein the polymeric monolayer is continuous.

In certain embodiments, the thin film comprises a first portion having a first composition and comprising a lateral edge, and a second portion having a lateral edge that is chemically bonded to the lateral edge of the first portion, the second portion having a second composition that is different from the first composition.

Articles comprising multiple monolayers are also disclosed, in accordance with certain embodiments. In some embodiments, the article comprises a first monolayer material having a first composition, and a second monolayer material having a second composition that is different from the first composition, wherein a face of the first monolayer material and a face of the second monolayer material interact via van der Waals forces, and wherein the first monolayer material and/or the second monolayer material comprises a polymeric monolayer.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
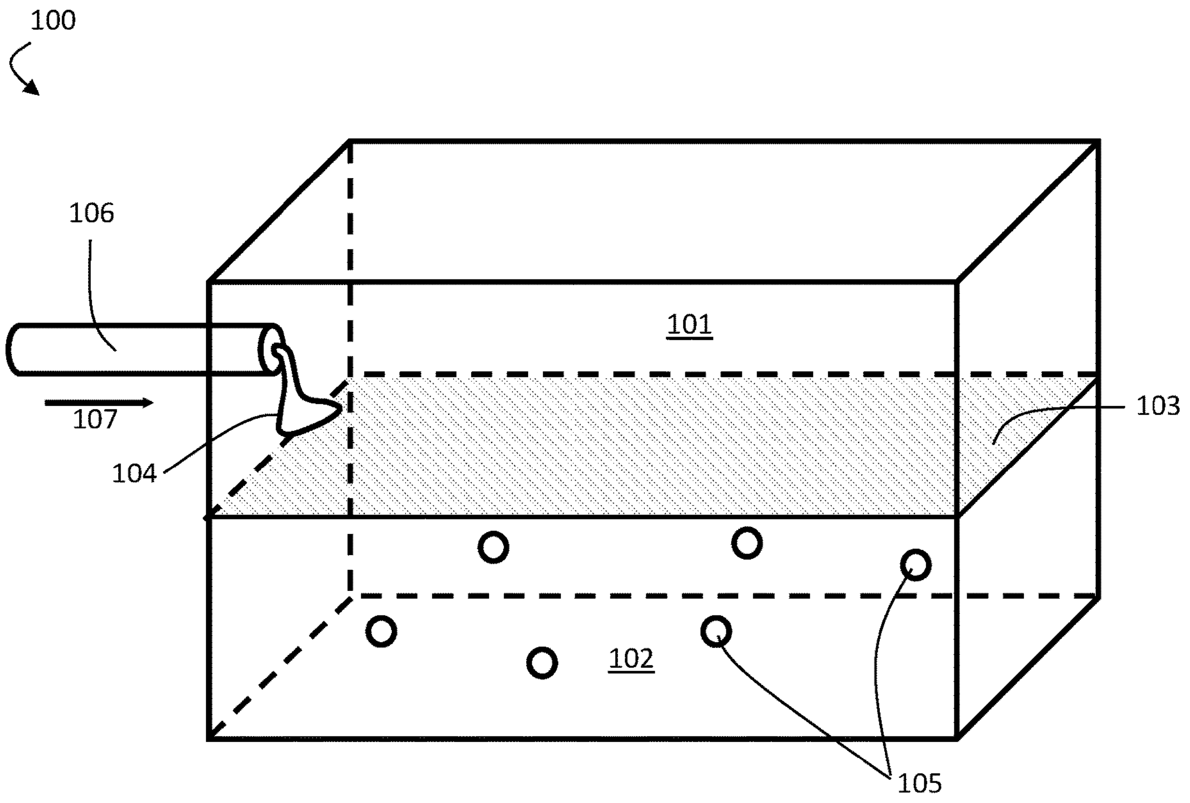
FIG. 1A is a perspective view schematic diagram of a system for forming thin films, according to certain embodiments.

The present disclosure describes inventive methods of making thin films, inventive thin films, and inventive articles and systems comprising thin films. Certain embodiments are related to methods of making thin films in which reagents (e.g., reactant(s) or catalyst(s)) interact at an interface between two liquid phases such that at least one reagent reacts (e.g., via polymerization) to form a thin film. In certain embodiments, one reagent (e.g., a reactant or a catalyst) is localized within one of the liquid phases, and another reagent (e.g., a reactant) is transported through one of the liquid phases to the interface, after which at least one of the reagents reacts to form the thin film. According to certain embodiments, one of the reagents can be delivered through a liquid phase in a manner that results in the thin-film-forming reaction being spatially localized at the interface, which can lead to the production of thin films having advantageous compositions, morphologies, physical characteristics, and the like.

Thin films (including two-dimensional materials, monolayers, and other thin films) disclosed herein can have one or more of a variety of advantageous properties including large lateral dimension(s), high mechanical strength, controlled spatial composition, and/or consistent thickness. Certain of the methods described herein can be used to produce thin films (e.g., two-dimensional (2D) polymeric films) having a variety of compositions with large-scale (e.g., wafer-scale) dimensions and homogeneity. As one example, in certain embodiments, methods described herein can be used to form monolayer polymeric materials (and, in some cases, 2D polymeric materials) that are mechanically robust, large-scale, freestanding, and/or porous. Such materials can be thought of as molecular and/or organic analogs to 2D atomic crystals (such as graphene, transition metal dichalcogenides, and the like).

In accordance with certain embodiments, thin films disclosed herein can be combined to form a variety of inventive multi-layer articles, including multi-layer articles comprising a combination of thin films having different compositions that interact with each other via van der Waals (vdW) forces.

As used herein, a "thin film" is a film having a thickness of less than or equal to 1 micrometer. The thickness of a film is determined as the average thickness of the film, determined as a number average and measured across the entirety of its surface. In some embodiments, the thin film can have a thickness of less than or equal to 500 nanometers, less than or equal to 100 nanometers, less than or equal to 50 nanometers, less than or equal to 10 nanometers, or less than or equal to 2 nanometers. In some embodiments, the thin film has a thickness of as little as 0.8 nanometers, as little as 0.5 nanometers, or less. In some embodiments, the thin film can be a monolayer (i.e., a layer that is one molecule in thickness). In certain embodiments, the thin film can be a two-dimensional (2D) material (i.e., a monolayer with a flat molecular structure).

Figure 1B:
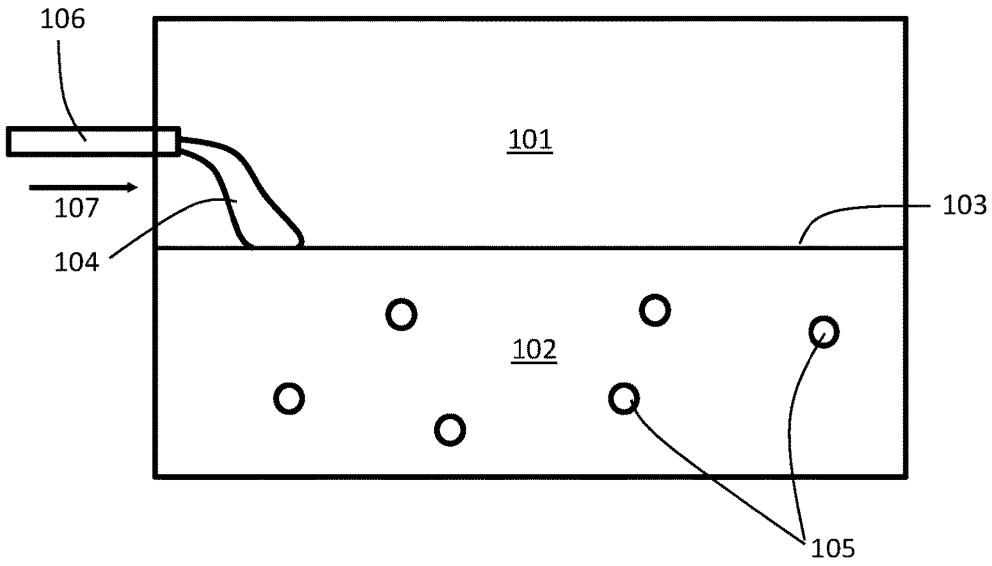
FIG. 1B is a cross-sectional schematic diagram of the system shown in FIG. 1A.

Certain embodiments are related to methods of forming thin films and related systems. FIG. 1A is a schematic illustration of a multi-phase system that can be used to form thin films, in accordance with certain embodiments. FIG. 1B is a cross-sectional schematic illustration of system 100 of FIG. 1A. In FIG. 1A, system 100 comprises first liquid phase 101 and second liquid phase 102. System 100 further comprises interface 103 between first liquid phase 101 and second liquid phase 102.

Multiple liquid phases can be produced, for example, by arranging two liquids, one on top of the other. As one non-limiting example, referring to FIG. 1A, liquid phase 102 can be added to a container, after which liquid phase 101 (which can be immiscible with liquid phase 102) can be added to the container. This results in first liquid phase 101 being located above second liquid phase 102. In some embodiments, the first liquid phase has a smaller relative density than the second liquid phase. For example, in FIG. 1A, first liquid phase 101 can have a smaller relative density than second liquid phase 102, resulting in first liquid phase 101 remaining located above second liquid phase 102. The two liquids may be, in certain cases, immiscible, having limited solubility in each other. The limited degree to which the liquid phases are soluble in each other can result in the formation of an interface between the two liquid phases.

In some embodiments, the method comprises delivering a first reagent to the interface between the first liquid phase and the second liquid phase. The reagent that is delivered through one of the liquid phases to the interface is also referred to herein as the "delivered reagent."

As used herein, the term "reagent" is used to refer to a species (e.g., molecules, atoms, and/or ions) that participates in a chemical reaction as a reactant or a catalyst. A variety of types of reagents can be used in association with the systems and methods described herein, including a variety of monomers and other reactants. Additional details regarding the types of reagents suitable for use with various of the systems and methods described herein are provided below.

Figure 1C:
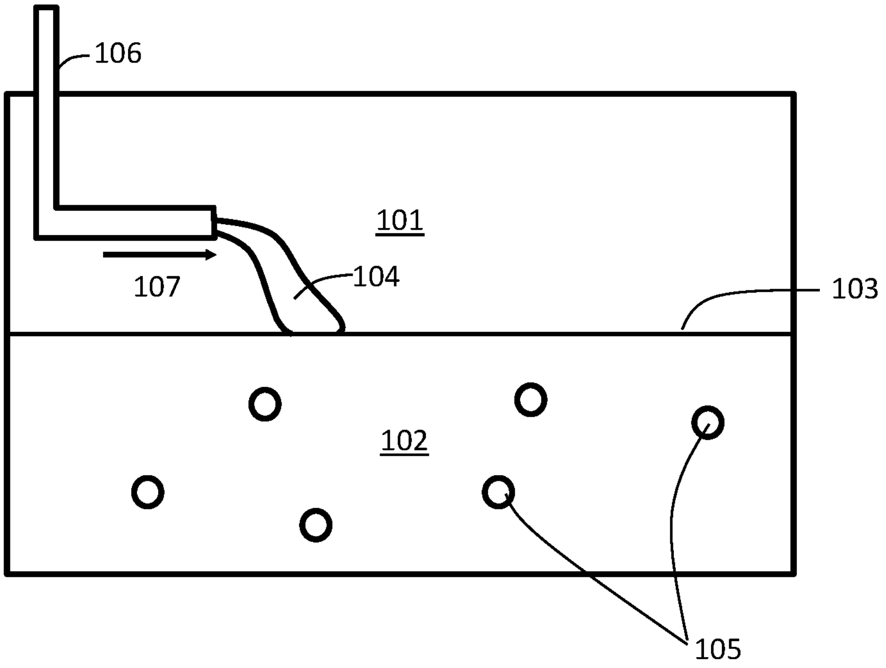
FIG. 1C is a cross-sectional schematic diagram of another system for forming thin films, according to some embodiments.

FIG. 1A shows one non-limiting example of the delivery of a reagent to an interface between two liquid phases. In FIG. 1A, reagent 104 is delivered to interface 103 by injecting reagent 104 into first liquid phase 101 through conduit 106. After reagent 104 is injected into first liquid phase 101, reagent 104 can migrate toward interface 103. While FIG. 1A illustrates injection of first reagent 104 into the side of first liquid phase 101, other configurations are also possible. For example, the conduit via which the first reagent is injected into the first liquid phase could enter the top of the first liquid phase. One such example is illustrated in FIG. 1C, in which an L-shaped conduit 106 is used to inject first reagent 104 into first liquid phase 101. Other options are also possible.

In certain embodiments, the delivered reagent does not dissolve within the first liquid phase before it is delivered to the interface between the two liquid phases. The use of a delivered reagent that does not dissolve within the first liquid phase can ensure that the delivered reagent does not spatially dissociate throughout the first liquid phase, which can allow for the delivery of the reagent to the interface in a controlled, spatially-precise manner.

One way of limiting the dissolution of the delivered reagent within the first liquid phase involves the use of a liquid carrier. In certain embodiments, delivering the first reagent to the interface between the first liquid phase and the second liquid phase comprises injecting a liquid carrier comprising the reagent into the first liquid phase. As one example, in FIG. 1A, the liquid effluent from conduit 106 can comprise a first reagent contained within a liquid carrier. The liquid carrier can, in some cases, be a solvent that dissolves the delivered reagent. In other cases, the delivered reagent is not dissolved in the liquid carrier, such as when the delivered reagent and the liquid form a mixture of a liquid and solid material (e.g., a suspension, a colloid, etc.). In some embodiments, the liquid carrier is miscible in at least one of the first liquid phase and the second liquid phase. For example, in some embodiments, the liquid carrier and the liquid phase through which the delivered reagent is delivered are each soluble in the other in an amount of at least 10 mg/mL (or at least 100 mg/mL) at 20° C. In certain embodiments, the liquid carrier and the second liquid phase are each soluble in the other in an amount of at least 10 mg/mL (or at least 100 mg/mL) at 20° C. Employing a liquid carrier that is miscible in at least one of the first liquid phase and the second liquid phase can ensure that the delivered reagent within the liquid carrier is available for reaction at the interface between the two liquid phases.

In embodiments in which the liquid carrier is miscible within the liquid phase through which the delivered reagent is delivered, the speed at which the liquid carrier is injected can be selected to be faster than the speed at which the liquid carrier mixes with the liquid phase through which the delivered reagent is delivered. This can ensure that the delivered reagent is not dispersed through the first liquid phase but, instead, is primarily (or completely) delivered to the interface between the first and second liquid phases.

In some embodiments, the liquid carrier has a higher relative density (e.g., at least 5% higher, at least 10% higher, at least 25% higher, at least 50% higher, or more) than the liquid phase through which the delivered reagent is delivered. In certain embodiments, employing a liquid carrier having a higher relative density than the liquid phase through which the delivered reagent is delivered can help ensure that the delivered reagent is delivered to the interface before it is dissociated within the phase through which it is delivered. In certain embodiments, the liquid carrier may be delivered through a liquid phase below the interface, and in such embodiments employing a liquid carrier having a lower relative density than such liquid phase can be similarly advantageous.

Another way of limiting the dissolution of the delivered reagent within the first liquid phase involves using a delivered reagent that does not dissolve within the first liquid phase. For example, the delivered reagent could be a liquid or solid that is insoluble or only slightly soluble within the first liquid phase. In some embodiments, the solubility of the delivered reagent in the first liquid phase is less than or equal to 0.1 mg/mL at 20° C. In still further embodiments, both the delivered reagent and the liquid carrier can have limited or essentially no solubility within the first liquid phase.

According to certain embodiments, the second liquid phase contains a second reagent. For example, in FIG. 1A, second liquid phase 102 contains second reagent 105. While FIG. 1A shows second reagent 105 within second liquid phase 102, the present disclosure is not so limited. In other embodiments, the first liquid phase (e.g., liquid phase 101 in FIG. 1A) contains the second reagent. The second reagent can participate in a reaction with the delivered reagent after the delivered reagent reaches the liquid-liquid interface, in some embodiments.

In some embodiments, it can be advantageous to confine the first and second reagents to their respective liquid phases. For example, in some embodiments, a large percentage (e.g., at least 95% wt%, at least 98 wt%, at least 99 wt%, or all) of the first reagent (e.g., delivered reagent 104 in FIG. 1A) is confined within the boundaries of the first liquid phase (e.g., liquid phase 101 in FIG. 1A). This can be achieved, for example, by selecting the liquids of the first and second liquid phases such that the first reagent is not dissolved in or otherwise transported into the second liquid phase. In some such embodiments, the solubility of the first reagent in the second liquid phase is less than or equal to 0.1 mg/mL at 20° C.

In some embodiments, a large percentage of the second reagent is confined within the first liquid phase or within the second liquid phase. For example, in certain embodiments, a large percentage (e.g., at least 95% wt%, at least 98 wt%, at least 99 wt%, or all) of the second reagent (e.g., reagent 105 in FIG. 1A) is confined within the second liquid phase (e.g., liquid phase 102 in FIG. 1A). This can be achieved, for example, by selecting the liquids of the first and second liquid phases such that the second reagent is dissolved or otherwise dispersed within the second liquid phase but is not dissolved in or otherwise transported into the first liquid phase. In some embodiments, the solubility of the second reagent in the second liquid phase is at least 1 mg/mL (or at least 10 mg/mL, or at least 100 mg/mL) at 20° C. In some such embodiments, the solubility of the second reagent in the first liquid phase is less than or equal to 1 mg/mL (or less than or equal to 0.1 mg/mL) at 20° C.

As another example, in some embodiments, a large percentage (e.g., at least 95 wt%, at least 98 wt%, at least 99 wt%, or all) of the second reagent is confined within the first liquid phase (e.g., liquid phase 101 in FIG. 1A). This can be achieved, for example, by selecting the liquids of the first and second liquid phases such that the second reagent is dissolved or otherwise dispersed within the first liquid phase but is not dissolved in or otherwise transported into the second liquid phase. In some embodiments, the solubility of the second reagent in the first liquid phase is at least 1 mg/mL (or at least 10 mg/mL, or at least 100 mg/mL) at 20° C. In some such embodiments, the solubility of the second reagent in the second liquid phase is less than or equal to 1 mg/mL (or less than or equal to 0.1 mg/mL) at 20° C. In certain embodiments in which the second reagent is contained within the liquid phase through which the first reagent is delivered, the delivery of the first reagent can be relatively fast such that a large portion (e.g., at least 90 wt%, at least 95 wt%, at least 99 wt%, or all) of the first reagent will be delivered to the interface between the first liquid medium and the second liquid medium before reacting with the second reagent.

In accordance with certain embodiments, confining a large percentage (or all) of the first reagent to the interface between the first liquid phase and the second liquid phase, and confining a large percentage (or all) of the second reagent to the first liquid phase or the second liquid phase can allow for better control of the kinetics of the reaction used to form the thin film, which can allow for the formation of thin films with more easily controllable properties.

In some embodiments, after the first reagent has been delivered to the interface between the first and second liquid phases, the first reagent reacts to form a thin film via interaction with the second reagent. For example, referring to FIG. 1A, after first reagent 104 has been delivered to interface 103, first reagent 104 can interact with second reagent 105 to form a thin film at or proximate to interface 103. In some embodiments, at least a portion (e.g., at least 25%, at least 50%, at least 75%, at least 90%, or all) of the thin film can be formed at or within 1 micrometer of the interface between the first liquid phase and the second liquid phase.

The first and second reagents can interact with each other in any of a variety of ways to form the thin film. For example, in some embodiments, the first reagent is a first reactant, and the second reagent is a second reactant that reacts with the first reactant to form the thin film. In other embodiments, the first reagent is a reactant, and the second reagent is a catalyst that catalyzes reaction of the first reagent (e.g., with itself and/or with an additional reactant) to form the thin film.

One advantage of certain of the methods described herein is that they may be compatible with a variety of reagents and thin-film-forming reactions. In accordance with certain embodiments, the compositions of the thin films can be easily tailored. For example, when monomers are used as a reactant, the composition of the thin film can be controlled by selecting the appropriate monomer. As one non-limiting example, some embodiments use a carboxylic acid-functionalized porphyrin to react with $Cu^{2+}$ions (e.g., from solubilized $Cu(NO_3)_2$) in order to form thin films via coordination bonds. In certain embodiments, an amine-functionalized porphyrin may react with a bridging aldehyde (e.g., terepthalaldehyde) to form thin films via formation of Schiff base-type structures. In some embodiments still, the thin-film forming reaction is a homocoupling reaction, whereby a molecule reacts with itself. Examples of homocoupling reactions include homocouplings of boronic acids and homocouplings of amines (to form diazo-based polymers). Other thin film-forming reactions are possible.

In some embodiments, the delivered reagent may be a monomer. The monomer may, in some embodiments, undergo polymerization at the interface to form the thin film. In some such embodiments, the monomer reacts with itself (e.g., catalyzed by the second reagent) to form the thin film. In other embodiments, the monomer reacts with the second reagent upon reaching the interface to form the thin film. Optionally, a third reagent (e.g., an additional reactant or an additional catalyst) or additional reagents may also be involved in the reaction of the first reagent.

In certain embodiments, the delivered reagent comprises a porphyrin or a porphyrin analog. Non-limiting examples porphyrin reagents include 5,10,15,20-tetrakis(4-carboxyphenyl)-porphyrin (also referred to as 2H-TCPP); 5,10,15,20-tetrakis(4-carboxyphenyl)-porphyrin platinum (II) (also referred to as Pt-TCPP); 5,10,15,20-tetrakis(4-carboxyphenyl)-porphyrin iron(III) chloride (also referred to as Fe-TCPP); 5,10,15,20-tetrakis(4-aminophenyl)-porphyrin (also referred to as TAPP); 5,10,15,20-(tetra-4-dihydroxyborylphenyl)porphyrin; and 5,10,15,20-tetrakis(4-aminophenyl)-porphyrin nickel(II) (also referred to as Ni-TAPP). Other porphyrins are possible. The use of certain porphyrins and/or porphyrin derivatives as a delivered reagent (e.g., as a delivered monomer) can be advantageous in certain cases as these molecules have at least two variation sites: one at the center of the porphyrin ring and at least one additional variation site on the phenyl groups. In some embodiments, variation of the center site of the porphyrin ring tunes the optical spectrum of the resulting thin film. In some embodiments, variation of the phenyl groups of the porphyrin controls the monomer-monomer bonds and lattice structures.

In some cases, the delivered reagent comprises a graphene nanoribbon precursor. One non-limiting example of such a precursor is shown, for example, in Example 7.

In some embodiments, reaction of the delivered reagent comprises the formation of new covalent bonds and/or new coordination bonds. For example, in some embodiments, monomers are used as the delivered reagent, and the monomers react at the interface between the first liquid phase and the second liquid phase such that the monomers become linked via covalent bonds or coordination bonds.

In certain embodiments, the delivered reagent can be amphiphilic. Without wishing to be bound by any particular theory, it has been observed that the delivery of amphiphilic reagents (e.g., amphiphilic monomers) to an interface between a hydrophilic liquid phase and a hydrophobic liquid phase results in the self-assembly of the reagent at the interface between the hydrophilic liquid phase and a hydrophobic liquid phase.

A variety of second reagents may also be used. In some embodiments, the second reagent is an ion. For example, the second reagent can comprise copper(II) nitrate, which can react with 2H-TCPP, Pt-TCPP, or Fe-TCPP to form a thin film. As another example, the second reagent can comprise terepthalaldehyde (TPA), which can react with TAPP to form a thin film. As another example, the second reagent (and/or a third reagent) can comprise palladium(II) acetate and/or potassium carbonate can, which can react with a boronic acid to form a thin film comprised of the homocoupled boronic acid. As yet another example, the second reagent (and/or a third reagent) can comprise sodium hypochlorite and/or hydrochloric acid, which can react with TAPP to form a thin film. As yet another example, the second (and/or third reagent) can comprise 2,3-dichloro-5,6-dicyano-1,4-benzoquinone (DDQ), and/or triflic acid (TfOH) and may react with a graphene nanoribbon precursor to form a thin film. Those of ordinary skill in the art, given the guidance provided by this specification, would be capable of selecting additional examples of suitable second reagents for use with a particular delivered reagent.

In some embodiments, the thin film can be formed using an amine-amine coupling reaction. In an amine-amine coupling (used interchangeably with "azo coupling"), the resulting thin film may polymerize through the formation of N-N bonds. An example of an amine-amine coupling reaction is shown as Reaction (1) below:

Reaction (1)

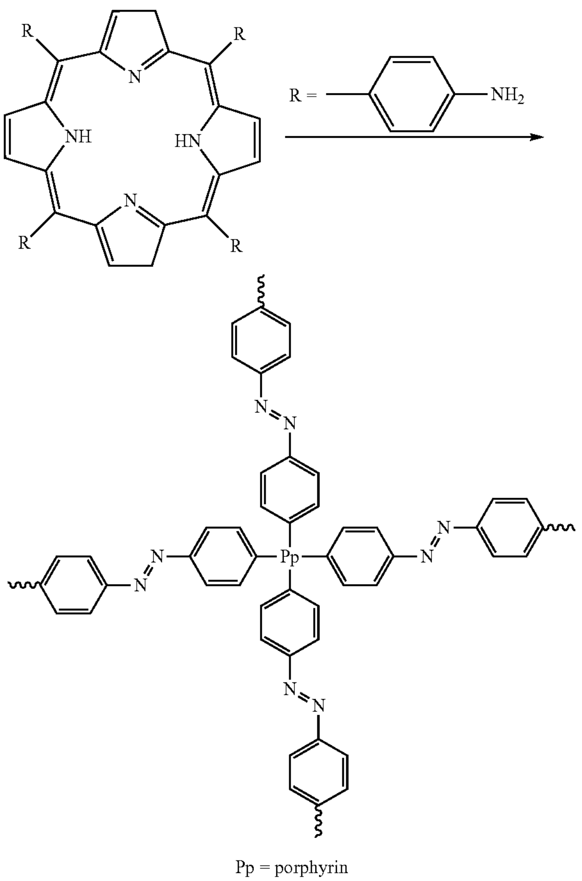

Pp = porphyrin

In some cases, the amine-amine coupling is a homocoupling reaction.

In some embodiments, the thin film can be formed using a boronic acid homocoupling reaction. A boronic acid homocoupling involves the reaction of one boronic acid with another boronic acid of the same chemical structure. An example of a boronic acid homocoupling reaction is shown as Reaction (2) below:

Reaction (2)

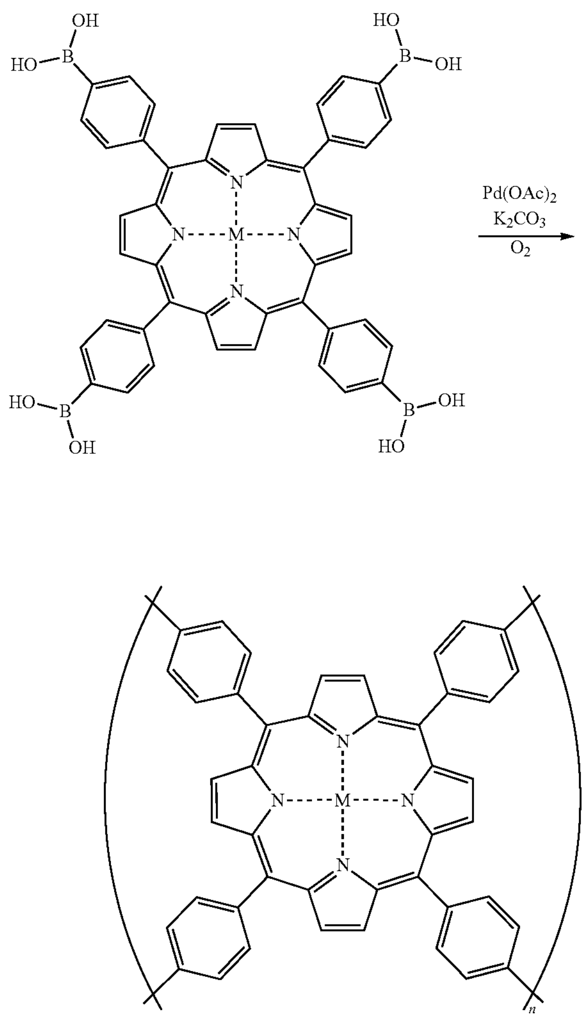

In some embodiments, the thin film can be formed using a Suzuki reaction. A Suzuki reaction (interchangeable with "Suzuki-Miyaura reaction," and "Suzuki coupling") involves the reaction of an organoboron species with a halide in the presence of base and a palladium catalyst to form at least one carbon-carbon bond. An example of a thin-film-forming Suzuki reaction is shown as Reaction (3) below:

Reaction (3)

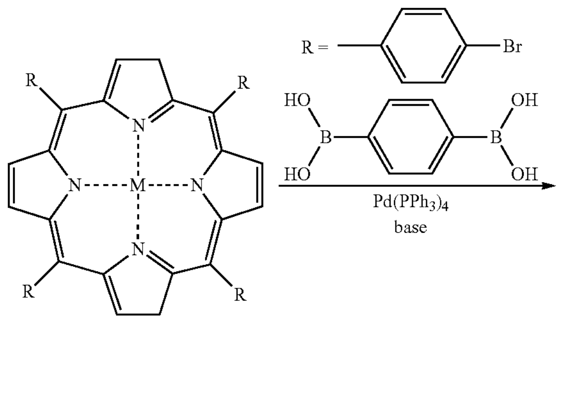

-continued

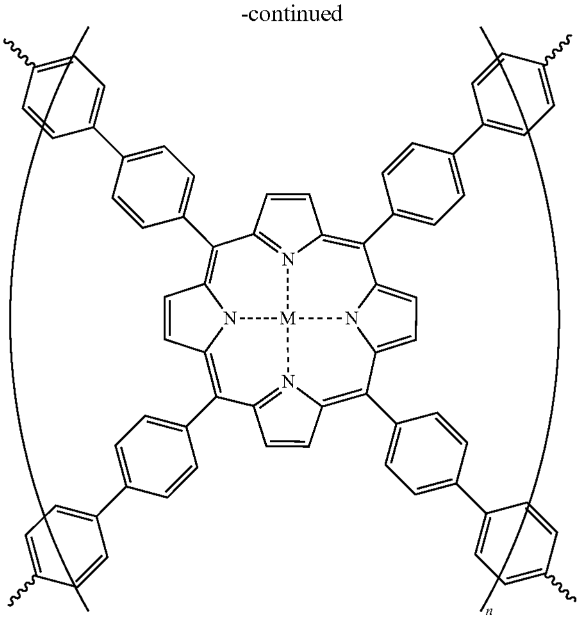

In some embodiments, the thin film can be formed using a Friedel-Crafts reaction. The Friedel-Craft reaction involves the reaction of an alkyl halide or aryl halide with an aromatic species in the presence of a Lewis acid (e.g., aluminum chloride). An example of a thin-film-forming Friedel-Crafts reaction is shown as Reaction (4) below:

Reaction (4)

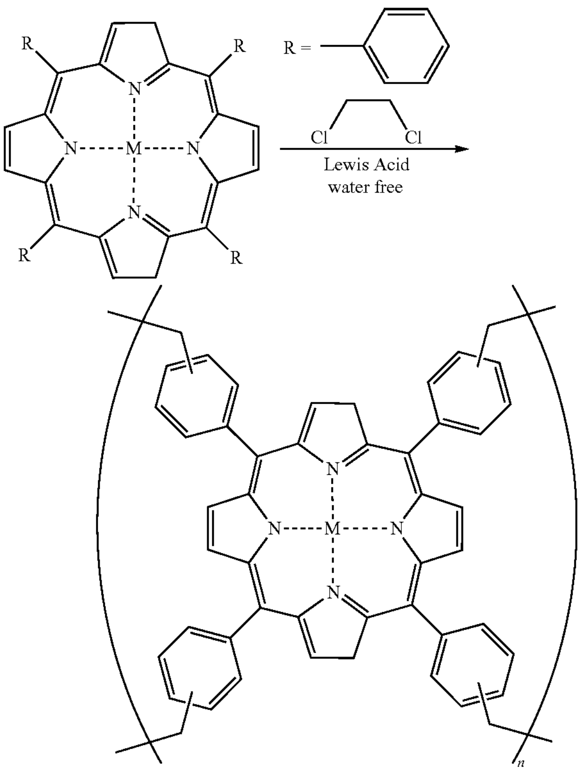

In some embodiments, the thin film can be formed using the Scholl reaction. In some embodiments, this reaction may use a graphene nanoribbon precursor (GNRP). The GNRP may react to form a graphene nanoribbon-based thin-film. An example of a reaction of this type is provided in Example 7.

The properties of the thin film that is produced can be influenced by a number of factors. For example, in some cases, the properties of the thin film can be influenced by the manner in which the delivered reagent is delivered to the interface between the first and second liquid phases. In certain embodiments, the delivered reagent is delivered through the first liquid phase using laminar flow. In some such embodiments, after the liquid carrier comprising the first reagent is delivered to the interface via laminar flow, the liquid carrier comprising the first reagent is transported along the interface via laminar flow. For example, referring to FIG. 1A, a pressure drop applied across conduit 106 can cause reagent 104 (which can be contained within a liquid carrier) to be transported along interface 103 in the direction of arrow 107.

In some embodiments, the laminar flow of the delivered reagent (e.g., monomers) provides large-scale continuity and homogeneity. Laminar flow may be provided by, for example, introducing the delivered reagent within a continuous stream of a liquid carrier. In some embodiments, as the liquid carrier transports the delivered reagent to the interface between the first liquid phase and the second liquid phase, the delivered reagent may spread by being restricted by the sidewalls of a container in which the first and second liquid phases are positioned. This may generate laminar flow of the reactant away from the injection region, which can result in continuous monolayer assembly. An example of laminar flow can be seen in FIG. 6B.

In some embodiments, the direction of the flow of the delivered reagent at the outlet of the conduit through which it is delivered is within 15° of parallel to (or within 10° , within 5° , or within 2° of parallel to) the interface between the first and second liquid phases. For example, in FIG. 1A the direction of the flow of delivered reagent 104 at the outlet of conduit 106 is indicated by arrow 107, which is parallel to interface 103. Similarly, in FIG. 1C, the direction of the flow of delivered reagent 104 at the outlet of conduit 106 (also indicated by arrow 107) is also parallel to interface 103. Without wishing to be bound by any particular theory, it is believed that delivering the reagent in this manner can reduce the degree to which flow of the delivered reagent disrupts the interface between the first and second liquid phases, which can lead to the production of continuous thin films with more consistent thicknesses and more robust mechanical properties. It should be understood that the invention disclosed herein is not limited to embodiments in which the direction of the flow of the delivered reagent at the outlet of the conduit through which it is delivered is within 15° of parallel to the interface between the first and second liquid phases, and in other embodiments, other angles (e.g., any angle between 0° and 90°) can be employed.

The properties of the thin film that is produced can also be influenced by the interaction between the first and second liquid phases. For example, in certain cases, the thickness of the thin film can be influenced by the degree of solubility of the first and second liquid phases in the other. In some embodiments, a larger degree of solubility between the first and second liquid phases produces thicker films. In contrast, the use of first and second phases that are less soluble in each other can result in the production of thinner films. In certain embodiments, neither of the first liquid phase and the second liquid are soluble in the other in an amount of more than 300 mg/mL (or more than 100 mg/mL, more than 10 mg/mL, more than 1 mg/mL, or more than 0.1 mg/mL) at 20° C. As one example, in some embodiments, the first liquid phase pentane and the second liquid phase is water, neither of which has a solubility in the other of more than 100 mg/L at 20° C. Without wishing to be bound by any particular theory, it is believed that the formation of a sharp interface between the first and second liquid phases can confine the delivered reagent (e.g., monomer) to a narrow region, which can be advantageous for precise control of the thickness of the thin film.

In some embodiments, the first liquid phase can be relatively thick. That is to say, the dimension of the first liquid phase in a direction perpendicular to the interface between the first liquid phase and the second liquid phase can be relatively large, in some embodiments. In certain embodiments, the thickness of the first liquid phase is at least 3 mm, at least 1 cm, at least 10 cm, or at least 100 cm. In certain embodiments, the second liquid phase can also be relatively thick. For example, in some embodiments, the thickness of the second liquid phase is at least 3 mm, at least 1 cm, at least 10 cm, or at least 100 cm.

One advantage of certain of the thin film formation methods described herein is that they may be performed under relatively mild conditions. In some embodiments, the spatially averaged temperature of the first phase and the second phase is less than 75° C. (or less than 60° C., less than 50° C., less than 40° C., or less than 30° C.) during the reaction of the first reagent. In certain embodiments, the spatially averaged temperature of the first phase and the second phase is close to room temperature (e.g., from 5° C. to 40° C., from 5° C. to 35° C., from 5° C. to 30° C., from 5° C. to 25° C., from 10° C. to 40° C., from 10° C. to 35° C., from 10° C. to 30° C., from 10° C. to 25° C., from 5° C. to 40° C., or from 5° C. to 40° C.) during the reaction of the first reagent. The spatially averaged temperatures of the first liquid phase and the liquid second phase are calculated as number averages as measured throughout the volumes of the first and second liquid phases.

While reference has been made to a delivered reagent interacting with a second reagent, it should be appreciated that additional reagents (e.g., a third reagent, a fourth reagent, a fifth reagent, etc.) may be present in first liquid phase and/or the second liquid phase. The additional reagents may be additional reactants and/or catalysts that facilitate and/or participate in the reaction of the delivered reagent with the second reagent.

Figure 1D:
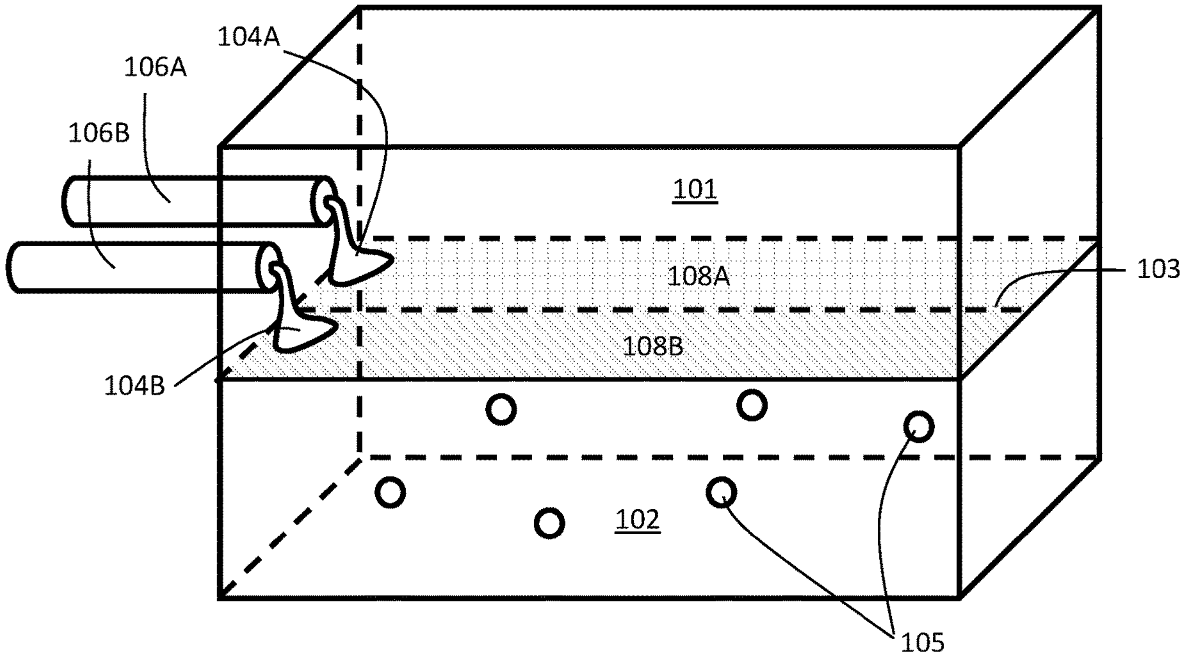
FIG. 1D is, in accordance with some embodiments, a perspective view schematic diagram of a system in which multiple reagents are used to form thin films with multiple compositionally-distinct regions.

In addition, while reference has been made to films formed using a single delivered reagent, in other embodiments, multiple reagents can be delivered through the first liquid phase and to the interface between the first and second liquid phases. In some such embodiments, each of the delivered reagents can react to form a region having a distinct chemical composition. One non-limiting method for forming such multi-component thin films is illustrated in FIG. 1D. In FIG. 1D, first delivered reagent 104A is expelled from first conduit 106A, and second delivered reagent 104B is expelled from second conduit 106B. First delivered reagent 104A is transported to first region 108A of interface 103, and second delivered reagent 104B is transported to second region 108B of interface 103. The second region (to which the second delivered reagent is delivered) can be laterally displaced from the first region (to which the first delivered reagent is delivered). For example, in FIG. 1D, second region 108B is laterally displaced from first region 108A. First delivered reagent 104A can react to form a first portion of a thin film (having a first composition) within region 108A, and second delivered reagent 104B can react to form a second portion of the same thin film (having a second composition that is different from the first composition) within region 108B. The two portions of the thin film can be chemically bonded to each other (e.g., via covalent bonds and/or coordination bonds), in some embodiments. For example, in some embodiments in which monomers are used as both the first and second delivered reagents, the monomers may cross-polymerize to form a single chemically bonded matrix with two distinct compositional regions. In some embodiments, third, fourth, fifth, or more reagents may be delivered through the first liquid phase and to the interface between the first and second liquid phases where they may react to form third, fourth, fifth, or more compositionally distinct regions within a single thin film.

In some embodiments, thin films can be grown with tunable compositions and widths by introducing different delivered reagents from each of a plurality of conduits. Optionally, the compositions and/or dimensions of each of the regions of the multi-component thin film can be tuned by controlling the relative injection rates of each of the delivered reagents.

Figure 1E:
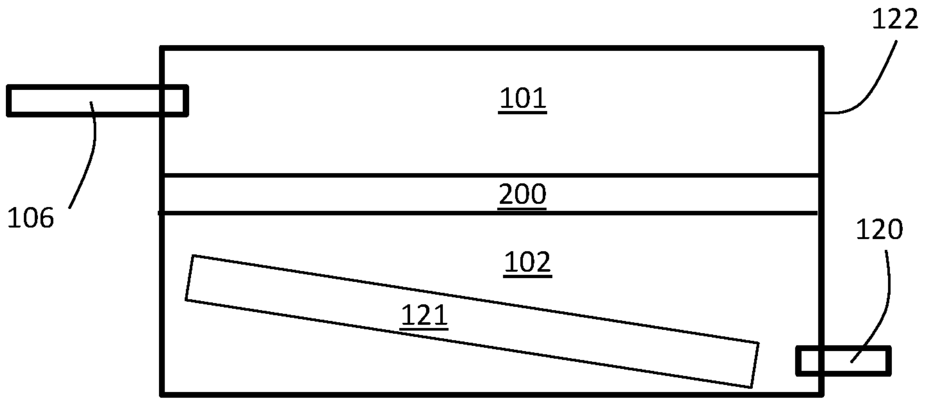
FIGS. 1E-1G are a series of cross-sectional schematic illustrations showing a method of removing liquid phases and a thin film, according to some embodiments.
Figure 1F:
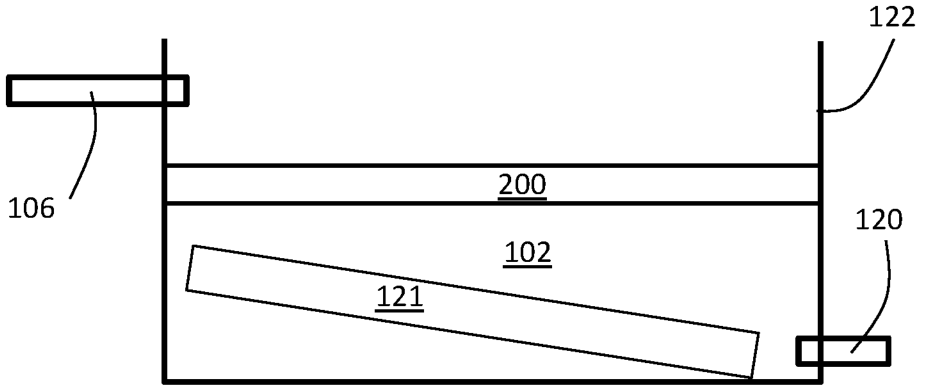
Figure 1G:
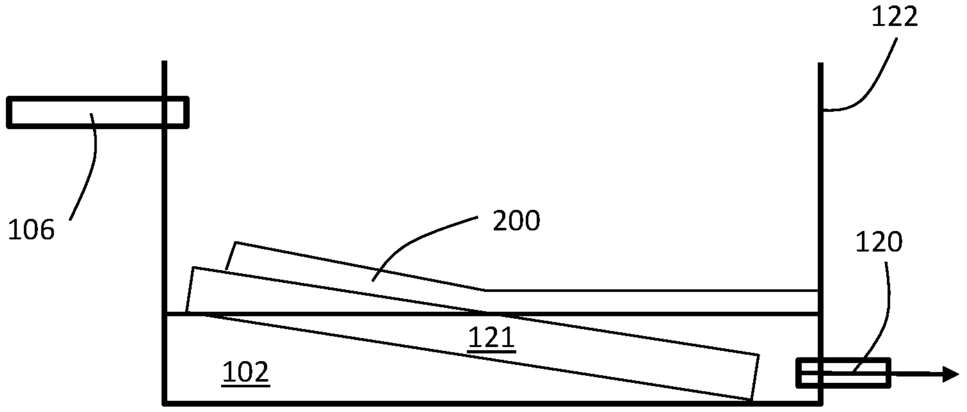

In certain embodiments, inventive methods described herein further comprise removing the thin film from a vessel in which the thin film has been formed. One example of a method in which the thin film is removed from such a vessel is illustrated in FIGS. 1E-1G. In FIG. 1E, first liquid phase 101 and second liquid phase 102 are contained within vessel 122. Thin film 200 has been formed at the interface between first liquid phase 101 and second liquid phase 102 (using any of the methods described elsewhere herein). In some embodiments, the method comprises removing the first liquid phase from the vessel. For example, referring to FIG. 1F, first liquid phase 101 has been removed from vessel 122, leaving behind thin film 200 above second liquid phase 102. The first liquid phase can be removed via any of a variety of suitable mechanisms. In certain embodiments, removing the first liquid phase comprises evaporating the first liquid phase. In some such embodiments, the first liquid phase may be heated during the evaporation and/or a vacuum may be applied to a gas phase in contact with the first liquid phase during the evaporation. In certain embodiments, the thin film may be collected onto a take-up reel. In certain embodiments, the thin film may be removed by suspending it away from the liquid phases, for example in order to facilitate drying of the thin film.

Certain embodiments comprise providing a substrate disposed in one or both of the first and second liquid phases in a vessel containing the first and second liquid phases, and transferring the thin film onto the substrate by removing the one or both of the first and second liquid phases from the vessel. For example, referring to FIGS. 1E-1G, substrate 121 has been provided within second liquid phase 102. As noted above, first liquid phase has been removed from vessel in 122. In some such embodiments, the second liquid phase can also be removed from the vessel. For example, in FIG. 1G, second liquid phase 102 is removed from vessel 122 by draining second liquid phase 102 through exit conduit 120. As second liquid phase 102 is drained from vessel 122, thin film 200 contacts the top surface of substrate 121. In some such embodiments, thin film 200 is removed from vessel 122 by removing substrate 121 from vessel 122.

In some embodiments, the thin film can be patterned. In embodiments in which the thin film is formed within a container, the thin film can be patterned before or after it has been removed from the container. Generally, in this context, "patterning" refers to the selective removal or modification of one or more regions of the thin film. The removal of the one or more regions of the thin film can lead to the formation of a pattern of removed portions. Any of a variety of suitable patterning methods can be used including, but not limited to, etching (e.g., wet etching or dry etching), laser patterning, and the like. In some embodiments, the patterning comprises one or more photolithography processes.

Figure 6A:
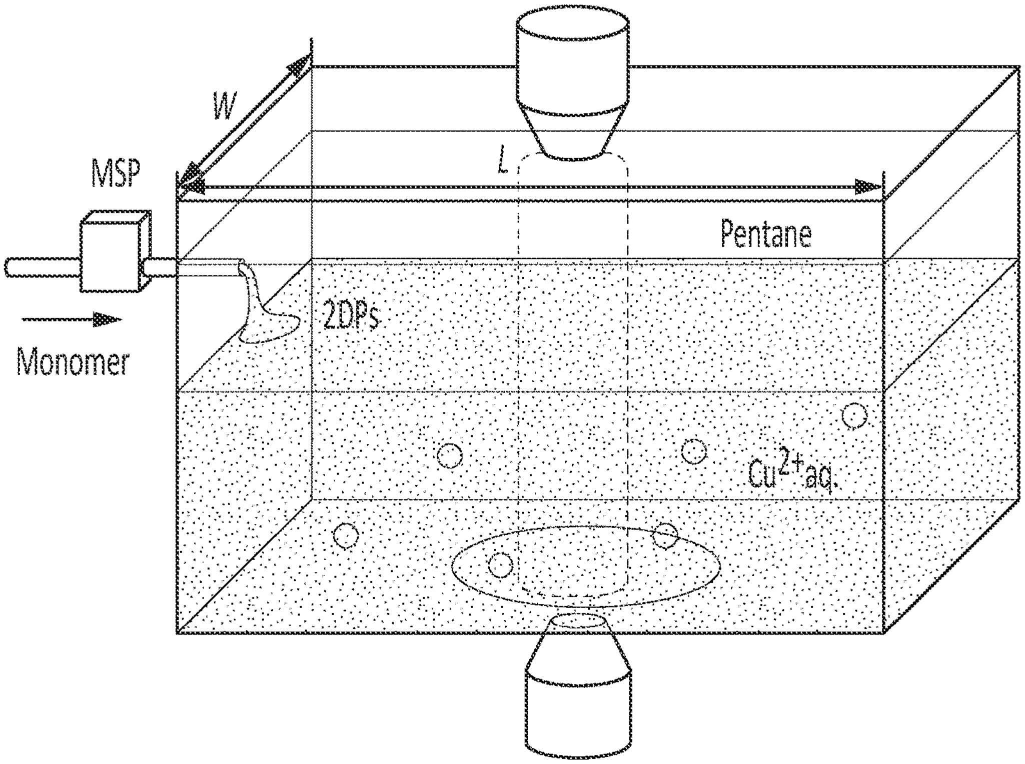
FIG. 6A is a schematic diagram depicting a system for synthesizing 2D polymer monolayers, including an in situ optical characterization apparatus, according to one set of embodiments.
Figure 6B:
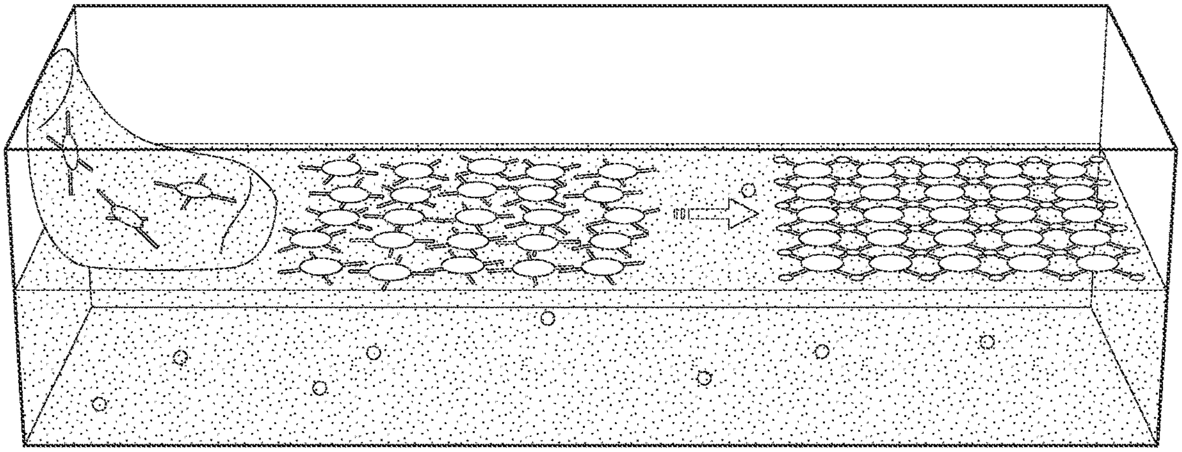
FIG. 6B is a schematic illustration of the laminar flow and self-assembly of monomers along an interface between two liquid phases, according to some embodiments.

It has been discovered that the use of a liquid-liquid interface can be particularly useful for the synthesis of polymeric thin films. One non-limiting set of embodiments is related to methods of forming polymeric thin films by introducing amphiphilic monomer reagents to the interface between the first and second liquid phases within a liquid carrier that is introduced using laminar flow. This process is referred to herein as "laminar assembly polymerization" (or "LAP"). In LAP, one or more amphiphilic monomers are delivered to the interface between the first and second immiscible liquid phases where they self-assemble and then polymerize at the interface to form a monolayer. FIG. 6A is a schematic illustration of a reactor that can be used to perform LAP. In FIG. 6A, the first liquid phase is shown as being pentane, and the second liquid phase is shown as being water (in which $Cu^{2+}$has been solubilized), but in other embodiments, other phases and reagents could be employed. In some embodiments, the monomer(s) are introduced from an edge of a reactor, having a width W, to the first liquid phase (e.g., a pentane liquid phase) using a constant stream of a liquid carrier comprising one or more dissolved monomers. The liquid carrier delivers the monomer(s) to the liquid-liquid (e.g., water-pentane) interface. As shown in FIG. 6B, the monomer(s) can assemble at the interface due to their amphiphilicity and may then spread along the interface while being confined by the longer sidewalls. This generates a laminar flow of the monomers away from the injection region, resulting in a continuous monolayer assembly. This laminar assembly of monomers then reacts with the reagent(s) present in the second liquid phase (e.g., $Cu^{2+}$ions or terephthalaldehyde in an aqueous phase), which may produce strongly bonded, continuous, and large-scale monolayer polymer films (which can, in some embodiments, be 2D films).

The use of LAP, in some embodiments, provides a facile method to produce polymeric thin films. In certain cases, these thin films may be monolayer organic polymeric films with a well-controlled thickness. In addition, the thin film positioned at the interface while open to liquid phases on both sides of the film may allow further introduction of other reactants after the synthesis for post-synthetic functionalization, which is described in more detail below.

Figure 2A:
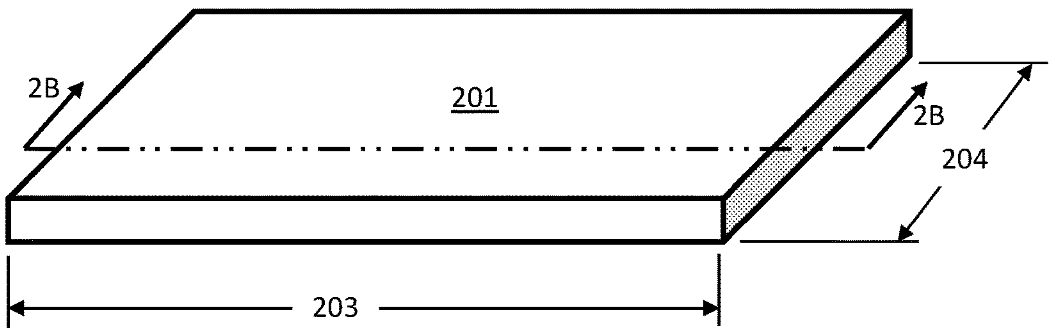
FIG. 2A is a perspective view schematic diagram of a thin film, according to certain embodiments.
Figure 2B:
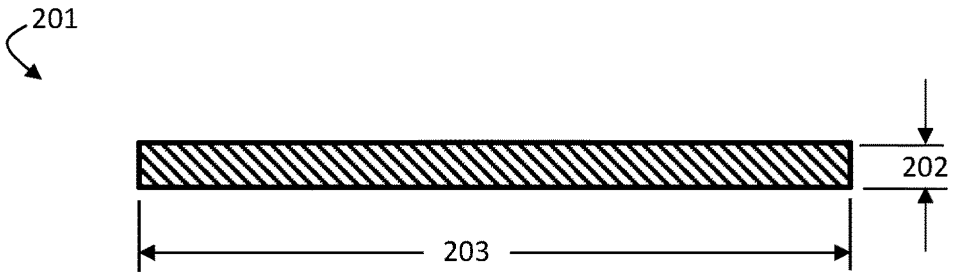
FIG. 2B is a cross-sectional schematic diagram of the thin film shown in FIG. 2A.
Figure 2C:
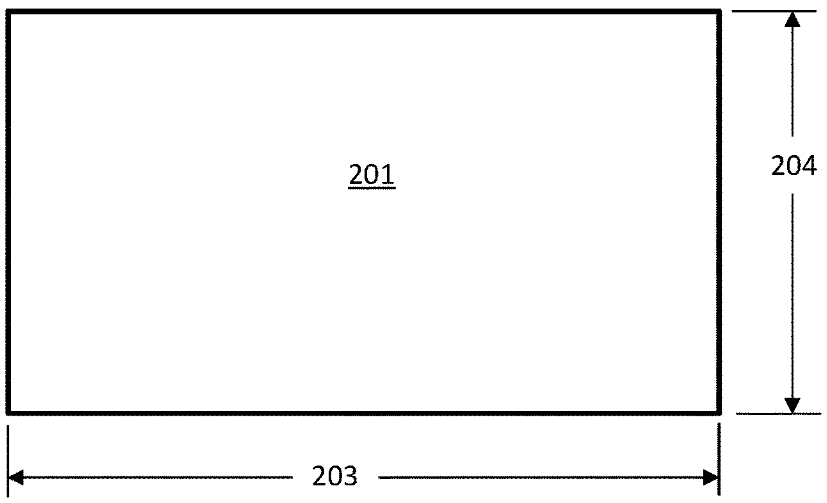
FIG. 2C is a top-view schematic diagram of the thin film shown in FIGS. 2A-2B.

Thin films made using the methods described herein can have a variety of beneficial properties. For illustrative purposes, a non-limiting schematic illustration of a thin film is provided in FIGS. 2A-2C. FIG. 2A is a perspective view schematic illustration of thin film 201; FIG. 2B is a cross-sectional schematic illustration of thin film 201; and FIG. 2C is a top-view schematic illustration of thin film 201.

As noted above, in certain embodiments, the thin films can be very thin. In some embodiments, the thin film is a monolayer. In some embodiments, the thin film is a 2D material.

In some embodiments, the variation of the thickness of the thin film across its lateral dimensions can be very small. The variation of the thickness of the thin film ($T_{Var}$) is expressed as a percentage and is determined as follows:

$$T_{Var} = \frac{\overline{\text{Max}_{10}} - \overline{T}}{\overline{T}} \times 100\%$$

where $Max_{10}$ is the number averaged thickness of the ten thickest local maxima of the thin film thickness and $\overline{T}$ is the average thickness of the thin film. In certain embodiments, the variation in the thickness of the thin film is less than 10%, less than 5%, less than 2%, or less than 1%.

The methods described herein can be used to produce continuous thin films. A thin film is considered to be continuous when it has fewer than $10^7$ through-thickness defects having cross-sectional areas of greater than 1 square micrometer per $cm^2$ of the facial area of the thin film. The cross-sectional area of a defect is measured in a direction perpendicular to the thickness of the thin film. In some embodiments, the thin films described herein have fewer than $10^5$, fewer than $10^3$, or fewer than 10 defects having cross-sectional areas of greater than 1 square micrometer per $cm^2$ of the facial area of the thin film.

The thin films described herein can have relatively large lateral dimensions, in some embodiments. The lateral dimensions of a thin film are its dimensions that are perpendicular to its thickness. To illustrate, thin film 201 in FIGS. 2A-2C has lateral dimensions 203 and 204, each of which are perpendicular to its thickness 202. The minimum lateral dimension of a thin film is the smallest of its lateral dimensions. For example, in FIGS. 2A-2C, the minimum lateral dimension of thin film 201 is dimension 204. For a thin film with a circular facial area, the minimum lateral dimension would be its diameter. For a thin film with an elliptical facial area, the minimum lateral dimension would be its minor axis. In some embodiments, the thin films described herein have a minimum lateral dimension of at least 5 centimeters, at least 25 centimeters, or at least 50 centimeters (and/or, in some embodiments, up to 100 centimeters, up to 1000 centimeters, up to 100 meters, or more).

In some embodiments, the thin film is crystalline (e.g., monocrystalline or polycrystalline). It is believed that the production of crystalline thin films is aided by the controlled nature by which the delivered reagent is delivered to and reacted at the interface between the first and second liquid phases. The embodiments described herein are not limited to the production of crystalline thin films, however, and in other cases, the thin film can be amorphous.

In some embodiments, the thin film is freestanding. A freestanding thin film is a thin film that is not bound to another solid material (such as an adjacent substrate). Freestanding thin films can be made, for example, by draining the first and second liquid phases after the thin film has been formed, leaving behind a freestanding thin film.

In certain embodiments, the thin film is self-supporting. A thin film is generally considered to be self-supporting when the thin film does not dissociate into multiple pieces when it is freestanding and it suspended from one end under the force of gravity. To test whether a thin film is self-supporting, one would secure the thin film by one of its ends (e.g., using tweezers or using any other suitable method), lift the thin film such that it is hanging by its secured end under the force of gravity, and determine whether the thin film dissociates into multiple pieces after it has been lifted. A cohesive thin film that can be handled without breaking into multiple pieces under the force of gravity is an example of a thin film that is self-supporting. A layer of loosely-bound monomeric material that cannot be handled without dissociating into individuated pieces is an example of a material that is not self-supporting. In some embodiments, the thin film can be transferred from one substrate to another substrate without dissociating into multiple pieces.

Certain of the thin films described herein can be functionalized after they have been synthesized (i.e., post-synthetic modification). Post-synthetic modification may be achieved by a variety of methods, including replacement and/or exchange of a metal, M1, with a different metal, M2; by the formation of new bonds (e.g., covalent, coordination, ionic); by ligand addition and/or exchange of a metal, M; or combinations thereof.

In some such embodiments, one or more reactants can be transported through the first liquid phase and/or the second liquid phase and to the thin film. The reactant may then react with the thin film to produce a functionalized thin film. In some embodiments still, the functionalization may occur after a thin film has been isolated and transferred out of the first and second liquid phases.

In one embodiment, the functionalization comprises a ligand exchange reaction. One example of such a reaction is shown below:

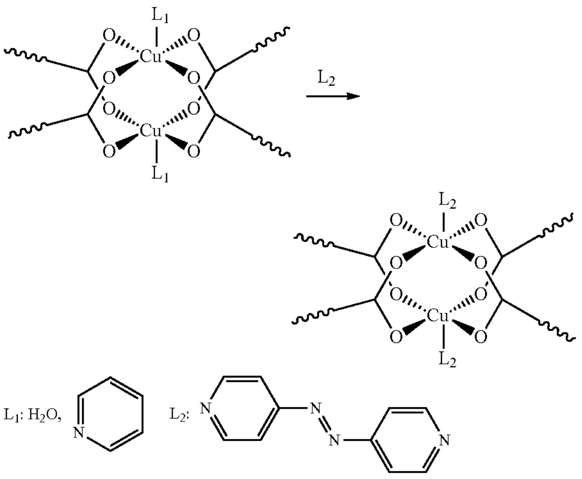

In some embodiments, a ligand, $L_1$ (e.g., water, pyridine), may be exchanged with a different ligand, $L_2$, (e.g. 4,4'-azopyridine). For example, in some embodiments, a thin film can be prepared in accordance with certain of the methods described herein, such that it includes ligand $L_1$. In some such embodiments, a solution containing ligand $L_2$ can be introduced to the first liquid phase, and $L_2$ can at least partially replace ligand $L_1$ within the thin film.

In certain embodiments, the functionalization of the thin film can impart one or more new functionalities to the thin film (e.g., electromagnetic radiation induced switching). In one non-limiting embodiment, the as-synthesized thin film can have $H_2O$ or pyridine as ligand $L_1$ on copper paddle wheels, and a solution containing 4,4'-azopyridine ($L_2$) can be introduced to the first liquid phase, after which the 4,4'-azopyridine can at least partially replace the $H_2O$ or pyridine. The 4,4'-azopyridine has a photo-switch characteristic which undergoes trans-cis transformation upon light illumination, imparting new functionality to the thin film.

In some embodiments, the thin film is nanoporous. The term “nanopore” is generally used herein to refer to pores having diameters of 100 nm or smaller. In some embodiments, the thin film comprises pores having diameters of 10 nm or smaller, or 1 nm or smaller. In some embodiments, the thin film has a total pore volume (which is the sum of the volumes of all of the pores within the thin film) and at least 50%, at least 75%, at least 90%, at least 95%, or at least 99% of the total pore volume of the thin film is attributable to nanopores. In some such embodiments, at least 50%, at least 75%, at least 90%, at least 95%, or at least 99% of the total pore volume of the thin film is attributable to pores having diameters of 10 nm or smaller or having diameters of 1 nm or smaller.

In some embodiments, the thin film can be very smooth. For example, in some embodiments, the thin film has an RMS surface roughness of less than 0.5 nm. RMS surface roughness can be measured using a Bruker Dimension Icon atomic force microscope over a 20 by 20 micrometer area sampled with a resolution of 512 by 512 pixels.

As noted above, a variety of materials can be used to form the thin films described herein. Accordingly, the thin films may have a variety of compositions. In some embodiments, the thin film comprises a polymeric material. As would be understood by those of ordinary skill in the art, polymeric materials are molecules that are made up of repeating subunits. In some embodiments, the thin film comprises an organic polymeric material. Organic polymers are polymers that have carbon atoms present in the backbone of the polymeric structure. Other materials are also possible. For example, in some embodiments, the thin film comprises graphene nanoribbons.

Figure 2D:
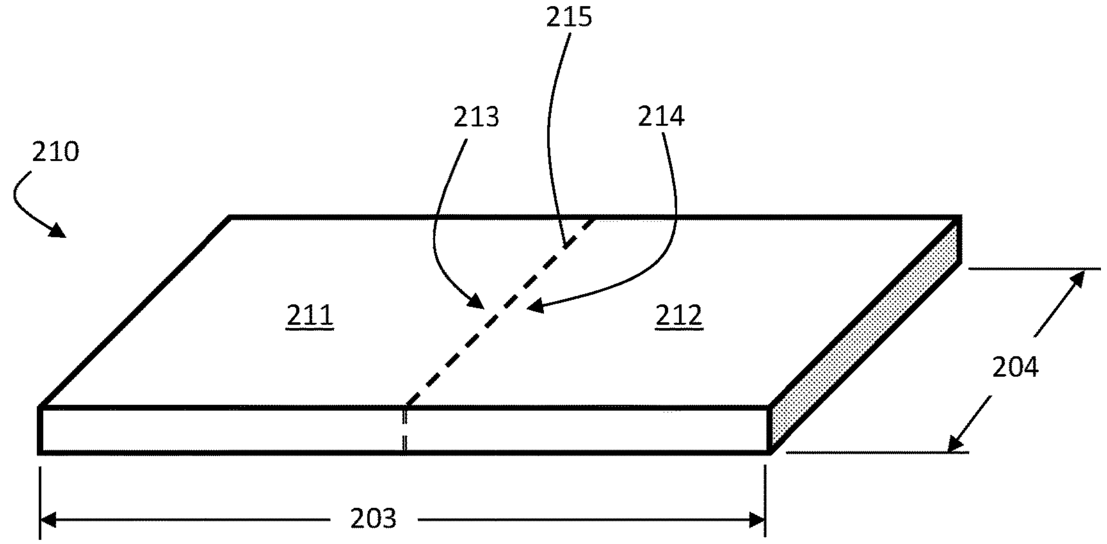
FIG. 2D is, in accordance with certain embodiments, a perspective view schematic diagram of a thin film comprising multiple compositionally distinct regions.
Figure 2E:
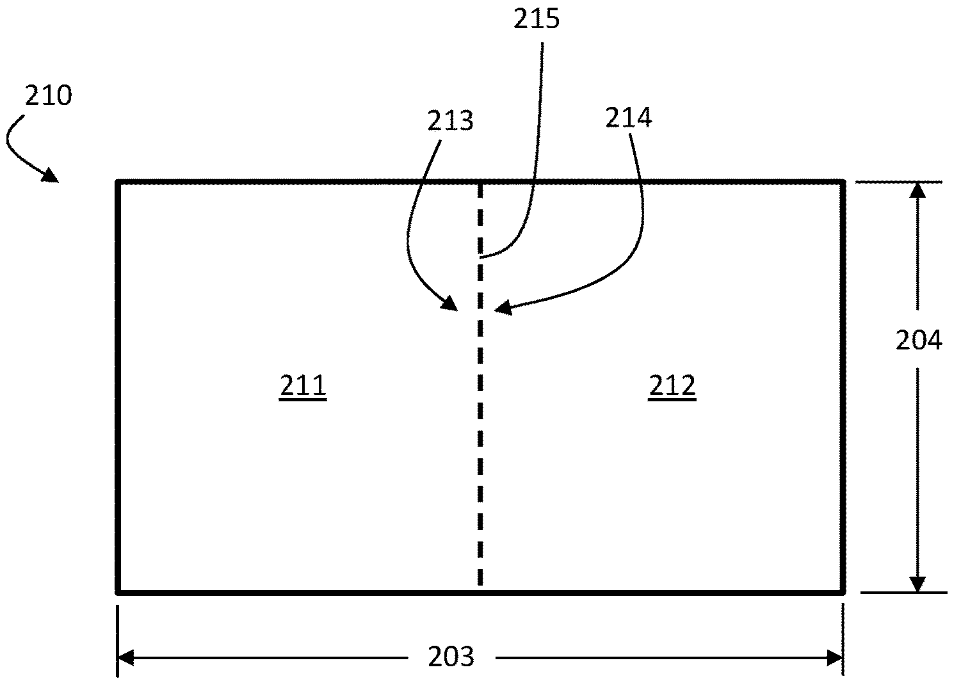
FIG. 2E is a top-view schematic diagram of the thin film shown in FIG. 2D.

In certain embodiments, the thin film comprises multiple materials integrated with each other such that the composition of the thin film changes across at least one of its lateral dimensions (also referred to herein as "lateral heterostructures"). For example, in some embodiments, the thin film comprises a first portion having a first composition, and a second portion having a second composition. In some such embodiments, the first portion has a lateral edge, and the second portion has a lateral edge that is chemically bonded to the lateral edge of the first portion (e.g., via covalent bonds and/or coordination bonds). One non-limiting example of such a thin film is shown in FIGS. 2D-2E. In FIGS. 2D-2E, multi-component thin film 210 comprises first portion 211 and second portion 212. In FIGS. 2D-2E, first portion 211 and second portion 212 are spaced in a side-by-side manner. First portion 211 can have a first composition (for example, due to its formation from a first type of delivered reagent), and second portion 212 can have a second composition that is different from the composition of first portion 211 (for example, due to its formation from a second type of delivered reagent that is different from the first type of delivered reagent). As shown in FIGS. 2D-2E, fist portion 211 has lateral edge 213, and second portion 212 has lateral edge 214 that is chemically bonded to the lateral edge of first portion 211 (along dotted line 215). The chemical bonding between first portion 211 and second portion 212 can be produced, for example, by delivering first and second reagents in a side-by-side configuration and reacting them over the same period of time (e.g., using the system illustrated in FIG. 1D).

Figure 3A:
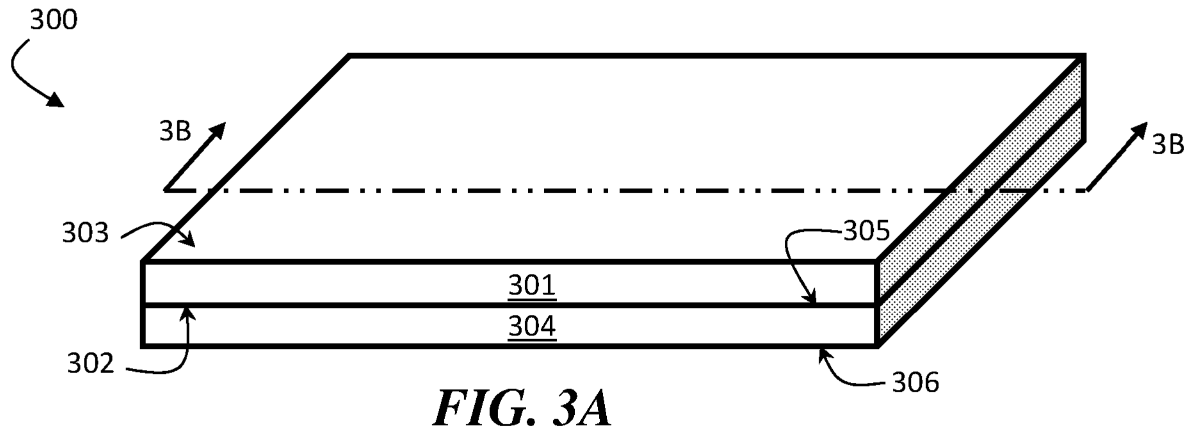
FIG. 3A is a perspective view schematic diagram of a multi-layer material comprising multiple thin films, according to certain embodiments.
Figure 3B:
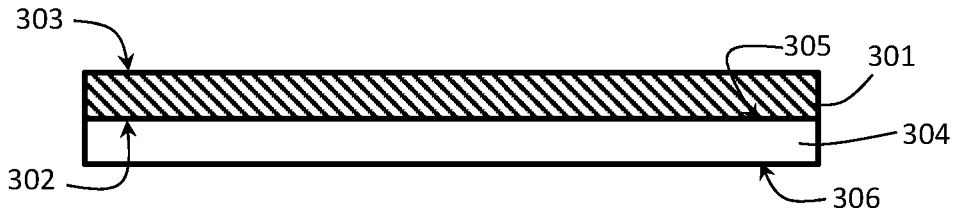
FIG. 3B is a cross-sectional schematic diagram of the multi-layer material shown in FIG. 3A.
Figure 3C:
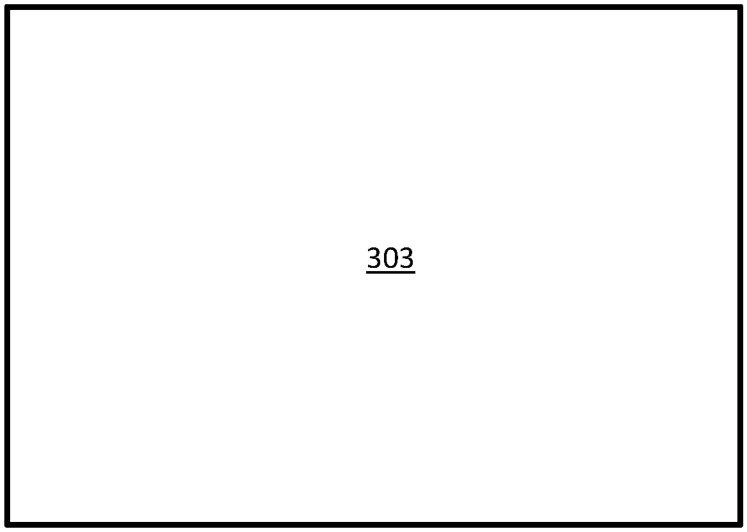
FIG. 3C is a top-view schematic diagram of the multi-layer material shown in FIGS. 3A-3B.

The thin films described herein may, in some cases, be stacked or otherwise manipulated to form multi-layer composite articles. One non-limiting example of such a multi-layer article is illustrated in FIGS. 3A-3C. In FIGS. 3A-3C, article 300 comprises first thin film 301 and second thin film 304. Each of the thin films can be, in certain embodiments, monolayers (e.g., 2D materials or other types of monolayers). The first thin film may have a first composition (e.g., due to being formed from a first reagent) and the second thin film may have a second composition that is different from the first composition (e.g., due to being formed from a second, different reagent).

A face of the first thin film and a face of the second thin film may interact via van der Waals forces. In FIG. 3A-3B, for example, first face 302 of first thin film 301 and first face 305 of second thin film 304 are positioned such that they face each other. The two thin films may be held in place relative to each other, at least in part, via van der Waals forces.

One advantage of certain of the methods described herein is that freestanding, self-supporting polymeric thin films (and, in some cases, organic polymeric thin films) can be formed. This can allow for the manipulation of polymeric thin films into multi-layer composite materials. Accordingly, in some embodiments, at least one of the thin films in the multi-layer composite materials described herein can be a polymeric thin film (e.g., comprising an organic polymeric material).

Multi-layer thin film composites described herein may include additional layers, in some embodiments. For example, the second thin film may have a second face (e.g., face 306 of second thin film 304 in FIGS. 3A-3B), and an additional thin film may be positioned adjacent to the second face of the second thin film. In some such embodiments, the faces of the second and additional thin films interact with each other via van der Waals forces. Similarly, in some embodiments, the first thin film may have a second face (e.g., face 303 of first thin film 301 in FIGS. 3A-3B), and an additional thin film may be positioned adjacent to the second face of the first thin film. In some such embodiments, the faces of the first and additional thin films interact with each other via van der Waals forces.

The thin films and/or multi-layer articles described herein may find use in a wide variety of applications.

In some embodiments, the thin film and/or the multi-layer article can be part of a photonic crystal. Photonic crystals are articles comprising a plurality of periodically occurring separate domains that are able to selectively absorb and transmit incident electromagnetic radiation. The thin films described herein could be used as one or more of the domains within a photonic crystal. For example, in some embodiments, a plurality of thin films could be stacked on top of each other to form a one-dimensionally periodic photonic crystal.

In certain embodiments, the thin film can be used in catalysis and/or biosensing. As one example, in some embodiments, the thin film can include one or more catalytically active sites (e.g., by selecting an appropriate formation chemistry for the thin film and/or by adding a species that is or is modified to become catalytically active after the fabrication of the thin film). As one non-limiting example, the iron porphyrins in 2DP III (described in Example 3 below) can be used as a catalyst for carbon dioxide reduction. In some embodiments, the as-synthesized film can be transferred onto an electrode and serve as a catalyst for electrocatalysis (e.g., for the reduction of carbon dioxide).

In some embodiments, the thin film can be used as a molecular sieve. For example, as noted above, in some embodiments, the thin films are nanoporous. In some such embodiments, the thin film comprises pores that are a few Angstroms or a few nanometers in size. These pores can, in accordance with certain embodiments, selectively block molecules that are larger than the pores while allowing smaller molecules to traverse the thickness of the thin film. Accordingly, the thin films can, in accordance with certain embodiments, be used to separate molecules having different sizes.

In some embodiments, the thin film and/or the multi-layer article can be used in an integrated circuit. For example, certain of the methods described herein can be used to synthesize thin films that are (electronic) conductors or semiconductors. Such thin films can be used, for example, to make all or a portion of an electrode (e.g., a source, a drain, and/or a gate) within an integrated circuit. Certain of the thin films described herein could be used to make all or a portion of a semiconductor domain of an integrated circuit (e.g., a domain on or within which the source, drain, and/or gate are arranged within the integrated circuit). In some embodiments, thin films disclosed herein can form all or a portion of a transistor (e.g., a field-effect transistor), a diode, a capacitor, an inductor, or a resistor.

The thin film and/or the multi-layer article can have, in some embodiments, a relatively high ionic conductivity. For example, in some embodiments, the thin film and/or the multi-layer article has a through-thickness ionic conductivity (i.e., an ionic conductivity measured through the thickness of the thin film/multi-layer article) of at least $10^{-5}$ S/cm at 25° C. for at least one ion. In some embodiments, the thin film and/or the multi-layer article has a through-thickness ionic conductivity of at least $10^{-5}$ S/cm at 25° C. for at least one of $H^+$, $Li^+$, $Na^+$, $Mg^{2+}$, $Al^{3+}$, and $Ca^{2+}$. In some embodiments, the thin film and/or the multi-layer article has a through-thickness ionic conductivity of at least $10^{-5}$ S/cm at 25° C. for $Li^+$. In some embodiments, the high ionic conductivity of the thin film and/or the multi-layer article can render it suitable for use in an electrochemical cell (e.g., a fuel cell, a battery, and/or a capacitor). In some such embodiments, the thin film and/or multi-layer article is positioned between a first electrode of the electrochemical cell and a second electrode of the electrochemical cell. The ionically conductive thin film and/or multi-layer article can facilitate the transport of electrochemically active ions between the two electrodes while also restricting (or prohibiting) the transport of electrons between the two electrodes.

Inventive thin films and/or multi-layer articles can also be used in water purification processes. For example, in some embodiments, thin films described herein can be used as all or part of an osmotic membrane. The osmotic membrane can be used, for example, as part of a forward osmosis process or a reverse osmosis process, in which a solvent (e.g., water) is preferentially transported across the osmotic membrane, from a retentate side of the membrane to a permeate side of the membrane, relative to one or more solutes (e.g., dissolved $Na^+$, $Cl^-$, and the like) present on the retentate side.

Inventive thin film and/or multi-layer articles can be used in osmotic power generation. For example, in some embodiments, thin films described herein can be used as all or part of an osmotic membrane. The osmotic membrane can be used, for example, as part of a reverse electrodialysis process or a pressure retarded osmosis process, in which salinity gradient power is generated from the salt concentration between seawater and river water. In a reverse electrodialysis process, cations are preferentially transported across an osmotic membrane relative to anions, or vice versa, generating net electric current. In a pressure retarded osmosis process, an osmotic membrane allows the solvent (e.g., water) to pass to the concentrated solution side by osmosis.

Inventive thin film and/or multi-layer articles can be used as a material platform of molecular qubits in quantum computing. For example, in some embodiments, thin films described herein can host electron spin centers (e.g. Cu(II), V(IV), Cr(IV)) that have long coherence time. The coherent state of the electron spins can be manipulated and measured electrically or optically. The spin centers are fundamental units for quantum computers, quantum teleportation, and quantum biosensing.

Certain of the methods described herein provide various advantages compared to traditional thin film fabrication processes such as Langmuir-Blodgett assembly. As one example, certain of the methods described herein allow for the use of a wide variety of materials (e.g., as the reactant(s)), which can allow one to produce thin films having any of a large number of different compositions. In a traditional Langmuir-Blodgett trough, only water-compatible reactions can be conducted. Using multiple liquid phases, on the other hand, allows one to select a larger number of thin film-producing reactions (and, thus, to produce a larger variety of types of thin films).

As another example, in accordance with certain embodiments, multiple sources of the delivered reagent may be used, which can allow for the easy scale-up of the size of the monolayer as well as for the fabrication of lateral heterostructures.

As yet another example, in certain cases, the use of multiple liquid phases can allow one to easily transfer the thin films that are produced, for example, by simply evaporating, draining, or otherwise removing the liquid phases. This can allow for the transfer and/or stacking of a number of thin films without creating voids and/or cracks.

The thin films synthesized at the liquid-liquid interface are, in some cases, compatible with a wide range of wafer-scale patterning and transfer techniques. In some embodiments, multiple patterning and transfer steps can be combined to fabricate laterally-patterned and vertically-stacked heterostructures while maintaining the integrity of intricate patterns.

U.S. Provisional Application No. 62/911,563, filed Oct. 7, 2019, and entitled "Large Lateral Scale Two-Dimensional Materials and Other Thin Films, and Associated Systems and Methods" is incorporated herein by reference in its entirety for all purposes.

The following examples are intended to illustrate certain embodiments of the present invention, but do not exemplify the full scope of the invention.

EXAMPLE 1

This example describes the preparation of the following monolayer 2-dimensional polymer, which is referenced as 2DP-I throughout the examples:

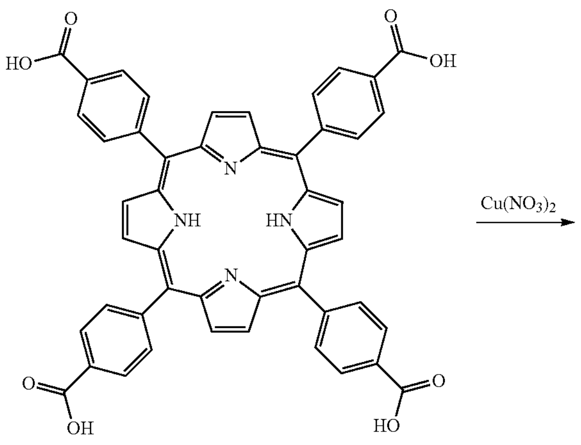

-continued

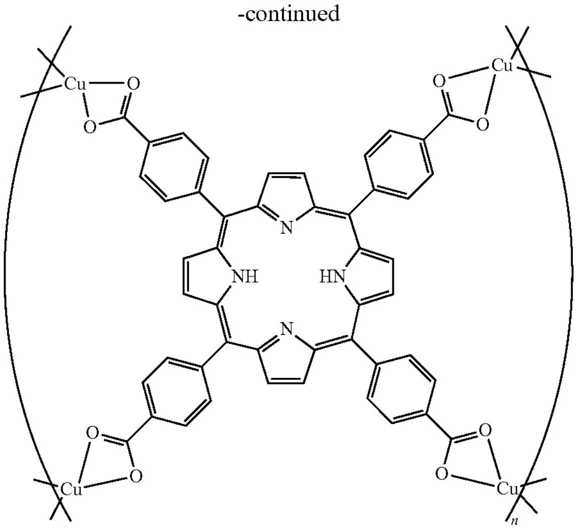

2DP-I

Preparation of 2DP-I was performed using a Teflon® reactor arranged as shown in FIG. 6A. The reactor was placed on an optical table in order to minimize vibrations. The first reagent was 5,10,15,20-tetrakis(4-carboxyphenyl)-porphyrin (or 2H-TCPP) within a first liquid phase of pentane. The second phase and second reagent were supplied by a 1 mM aqueous solution of $Cu(NO_3)_2$. Solubilized $Cu^{2+}$was used as the second reagent, and water served as the second phase.

Figure 4A:
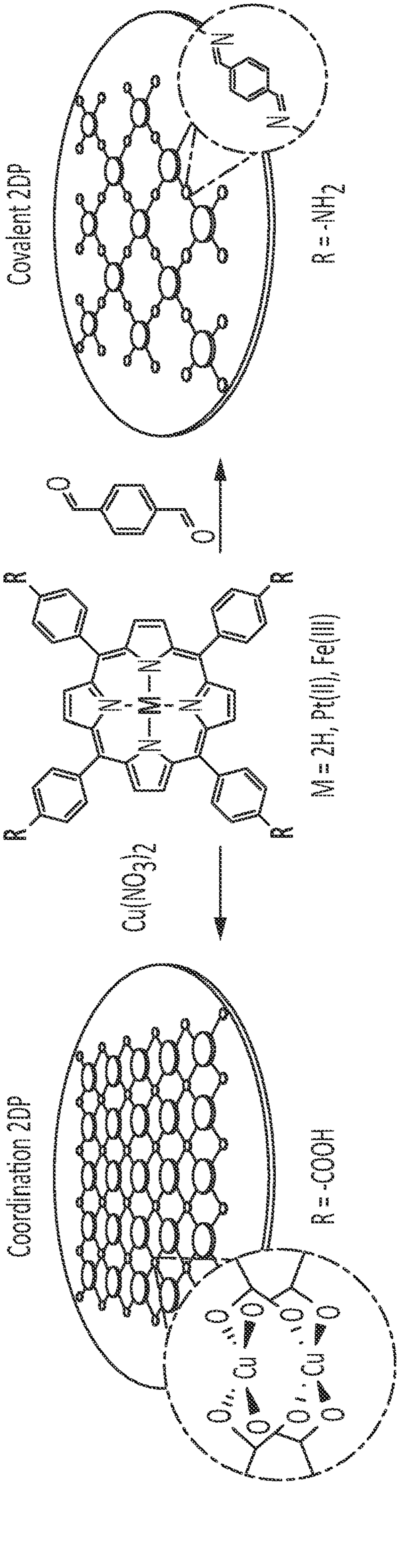
FIG. 4A is a schematic diagram showing a variation of porphyrin monomers connected in a square lattice through coordination bonds of $Cu^{2+}$ions to the—COOH moieties of the porphyrin monomer and covalent bonds via the Schiff base reaction in the presence of terephthalaldehyde, according to one set of embodiments.

The 2H-TCPP was first dissolved in a solvent mixture of chloroform:methanol (3:1, v/v) to form a 0.1 mM solution, which was subsequently dispensed by a syringe pump (New Era Pump System Inc., NE-1010) into the pentane phase, as illustrated in FIG. 6A. After the 2H-TCPP was dispensed into the pentane phase, the 2H-TCPP migrated to the interface between the pentane phase and the aqueous phase, illustrated schematically in FIG. 6B. Once the 2H-TCPP reached the interface, the 2H-TCPP reacted with $Cu^{2+}$ions to form two-dimensional square lattices through coordination bonds via a copper paddle wheel structure, as shown in FIG. 4A.

Figure 6C:
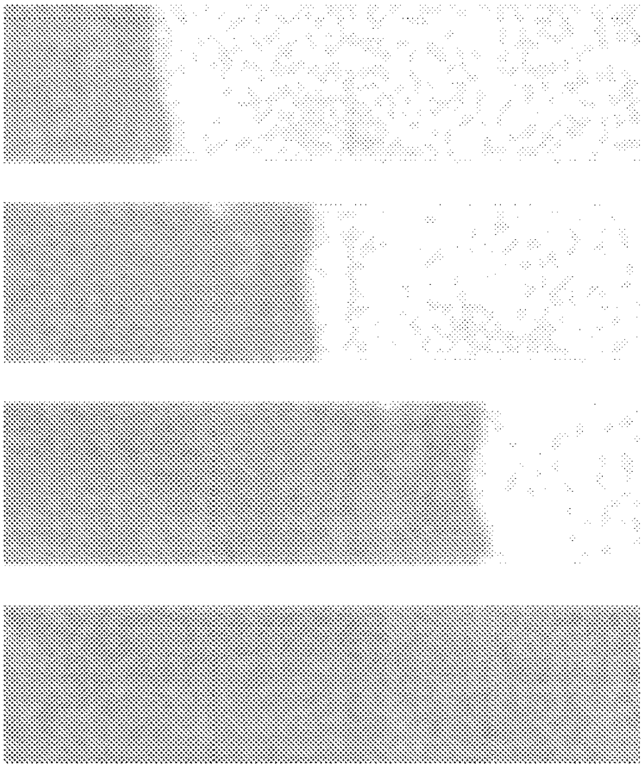
FIG. 6C is a series of optical images showing unidirectional movement of the monolayer assembly parallel to the longer sidewalls of a reactor, according to some embodiments.

For growth in a 1-inch wide reactor, an injection rate of 10 μL/min was used. For growth in a 2-inch wide reactor, 3 evenly spaced injection nozzles were employed, and the rate of each was set to be 10 μL/min. The volume of precursor solution needed to cover a unit surface area was 4 $\mu L/inch^2$. The reaction time was about 30 mins. The flow of precursor solution was observed to be a laminar flow, as illustrated in FIG. 6B, and as demonstrated by FIG. 6C, which includes a series of images of a 2DP-I film at four different stages during its growth (with the delivered reagent being injected from the left side of the figure). After the interfacial polymerization was complete, the first liquid phase (water) was slowly drained to transfer the 2DPI film onto a target substrate that was initially submerged in the first liquid phase prior to growth.

Figure 6D:
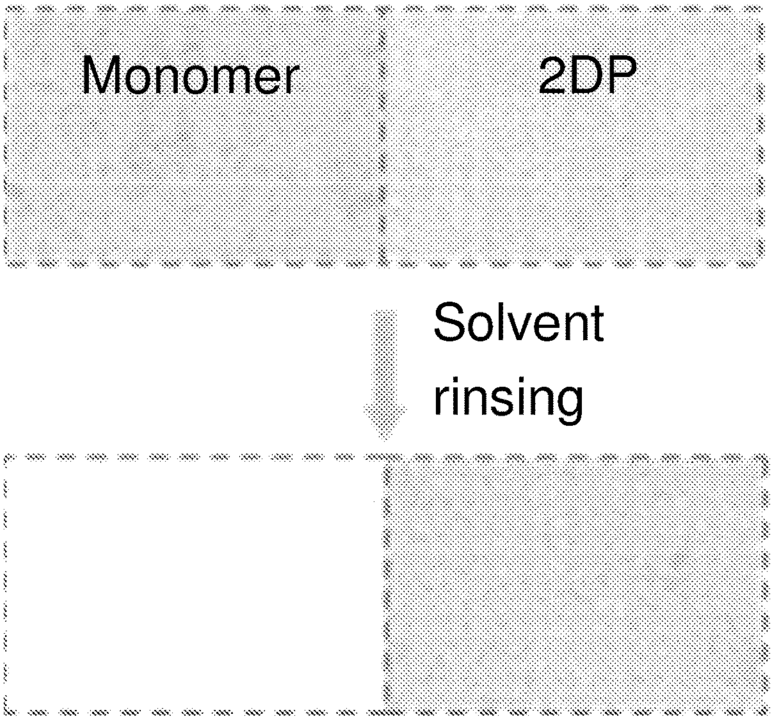
FIG. 6D is a series of optical transmission images comparing a layer of monomer vs. a polymerized 2D polymer monolayer before and after solvent washing, according to one set of embodiments.
Figure 6E:
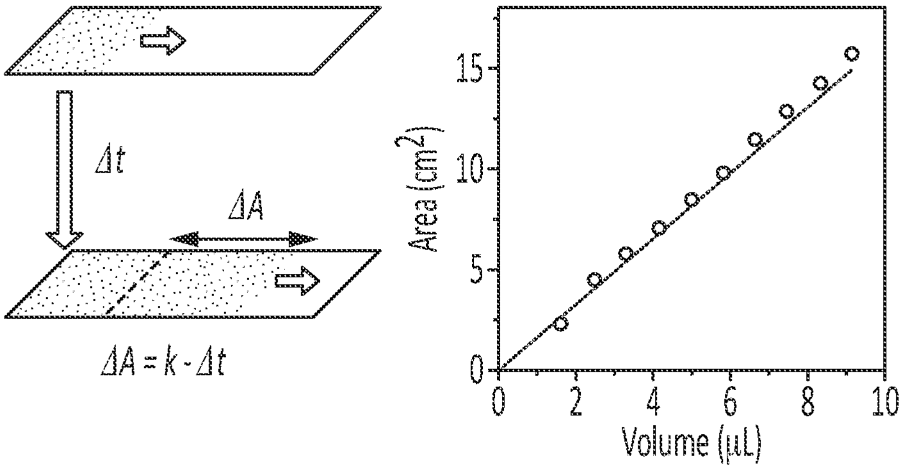
FIG. 6E shows a schematic of a proposed growth model and quantitative measurements of the synthesized area of 2DP-I as a function of the injected volume of the monomer solution; according to one set of embodiments.

The polymerized 2DP-I was mechanically robust, as demonstrated in FIG. 6D. In FIG. 6D, a substrate comprising unpolymerized 2H-TCPP is washed away by solvent; however, the polymerized 2DP-I remains intact upon washing, demonstrating the robustness of the polymerized 2DP film. The left-hand side of FIG. 6E is a schematic of a proposed linear growth model. In this model, the film area increases linearly over time with a rate constant k, $k=C_N \cdot v \cdot \eta / N_{eff}$, where $C_N$ is number concentration of the molecular precursor, $A_0$ is unit cell area of the 2DP-I lattice, v is volumetric injection rate, η is monomer-to-monolayer yield, and $N_{eff}$ is effective layer number. The right-hand side of FIG. 6E shows quantitative measurements of the synthesized area of 2DP-I as a function of the injected volume of the monomer solution closely follows a linear growth model, which confirms a near-unity monomer-to-monolayer yield.

EXAMPLE 2

This example describes the preparation of the following monolayer 2-dimensional polymer, which is referenced as 2DP-II throughout these examples:

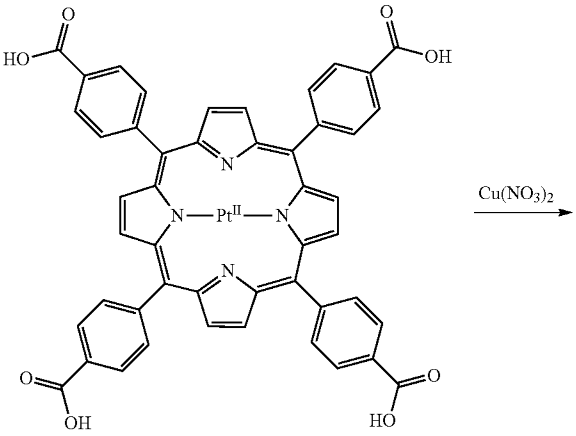

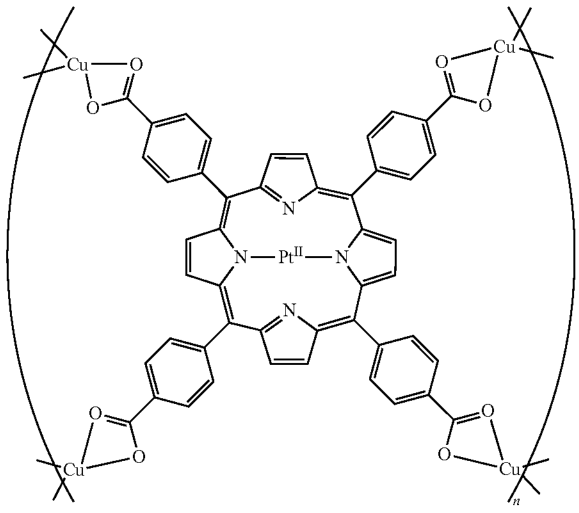

2DP-II

The same reactors and same reaction time used in Example 1 were also used in this example. The first reagent was 5,10,15,20-tetrakis(4-carboxyphenyl)-porphyrin platinum (II) (Pt-TCPP) within a first liquid phase of pentane. The second phase and second reagent were supplied by a 1 mM aqueous solution of $Cu(NO_3)_2$. Solubilized $Cu^{2+}$was used as the second reagent, and water served as the second liquid phase.

The Pt-TCPP was first dissolved in a solvent mixture of chloroform:methanol (3:1, v/v) to form a 0.1 mM solution, which was subsequently dispensed via a syringe pump (New Era Pump System Inc., NE-1010) into the pentane phase. After the Pt-TCPP was dispensed into the pentane phase, the Pt-TCPP migrated to the interface between the pentane phase and the aqueous phase, illustrated schematically in FIG. 6B. Once the Pt-TCPP reached the interface, the Pt-TCPP reacted with $Cu^{2+}$ions to form two-dimensional square lattices through coordination bonds via a copper paddle wheel structure.

EXAMPLE 3

This example describes the preparation of the following monolayer 2-dimensional polymer, which is referenced as 2DP-III throughout the examples:

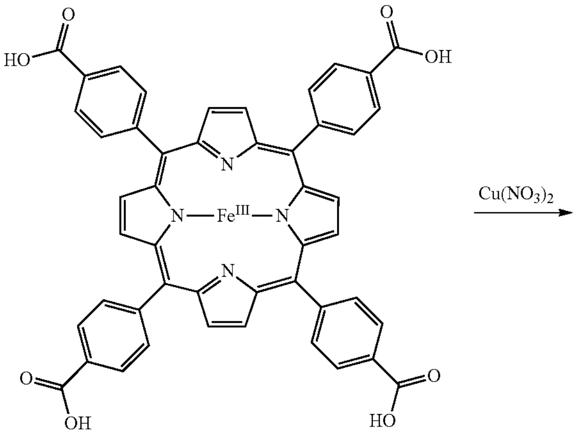

-continued

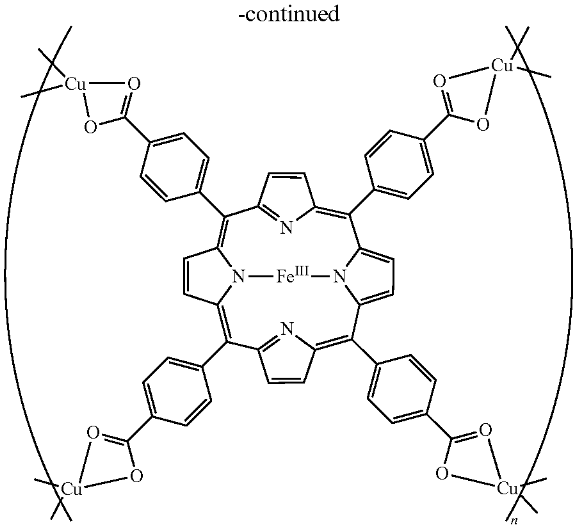

2DP-III

The same reactors and same reaction time used in Examples 1 and 2 were also used in this example. 5,10,15,20-tetrakis(4-carboxyphenyl)-porphyrin iron(III) chloride (or Fe-TCPP) was used as the first reagent with pentane as the first liquid phase. The second liquid phase (water) comprised a 1 mM aqueous solution of $Cu(NO_3)_2$, and $Cu^{2+}$served as the second reagent. The Fe-TCPP was first dissolved in a solvent mixture of pyridine:methanol (3:1 v/v) to form a 0.1 mM solution, which was subsequently dispensed by a syringe pump (New Era Pump System Inc., NE-1010) into the pentane phase, as shown in FIG. 6A. After the Fe-TCPP was dispensed into the pentane phase, the Fe-TCPP migrated to the interface between the pentane phase and the aqueous phase, illustrated schematically in FIG. 6B. Once the Fe-TCPP reached the interface, the Fe-TCPP reacted with $Cu^{2+}$ions to form two-dimensional square lattices through coordination bonds via a copper paddle wheel structure.

EXAMPLE 4

This example describes the preparation of the following monolayer 2-dimensional polymer, which is referenced as 2DP-IV throughout the examples:

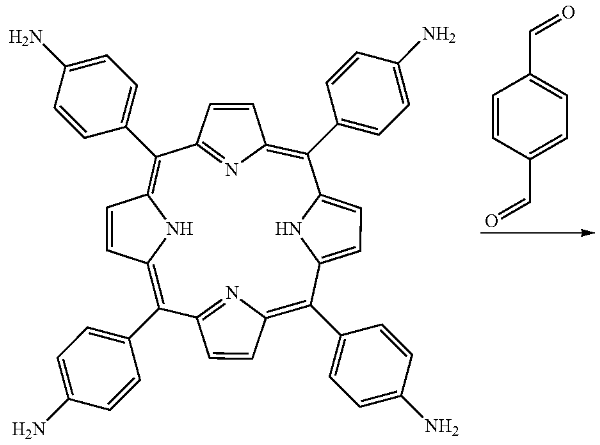

-continued

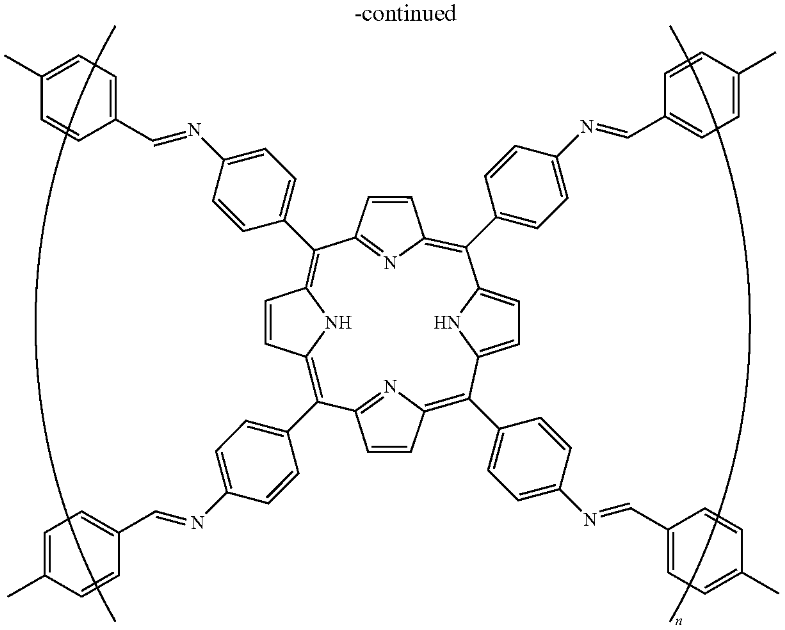

2DP-IV

The same reactors and same reaction time used in Examples 1-3 were also used in this example. The first reagent was 5,10,15,20-tetrakis(4-aminophenyl)-porphyrin (TAPP) and the first liquid phase was pentane. The second liquid phase and the second reagent were supplied by a 12.5 mM solution of terephthalaldehyde (TPA) dimethylformamide (DMF) in water (1:19, v/v). The solution further comprised 0.5 mg/mL of $Sc(OTf)_3$, which served as a catalyst (and a third reagent). The addition of DMF in the aqueous phase helped to increase the dissolution of the TPA.

The TAPP was dissolved in a solvent mixture of pyridine: methanol (3:1 v/v) to form a 0.1 mM solution, which was subsequently dispensed by a syringe pump (New Era Pump System Inc., NE-1010) into the pentane phase, as shown in FIG. 6A. After the TAPP was dispensed into the pentane phase, the TAPP migrated to the interface between the pentane phase and the aqueous phase, illustrated schematically in FIG. 6B. Once the TAPP reached the interface, the TAPP reacted with TPA (the second reagent) to form two-dimensional square lattices through a Schiff base reaction of TPA with the carboxylic acid moieties of TAPP, as shown in FIG. 4A.

EXAMPLE 5

The following example describes the preparation of a monolayer 2DP by homocoupling of a boronic acid-functionalized porphyrin as shown below:

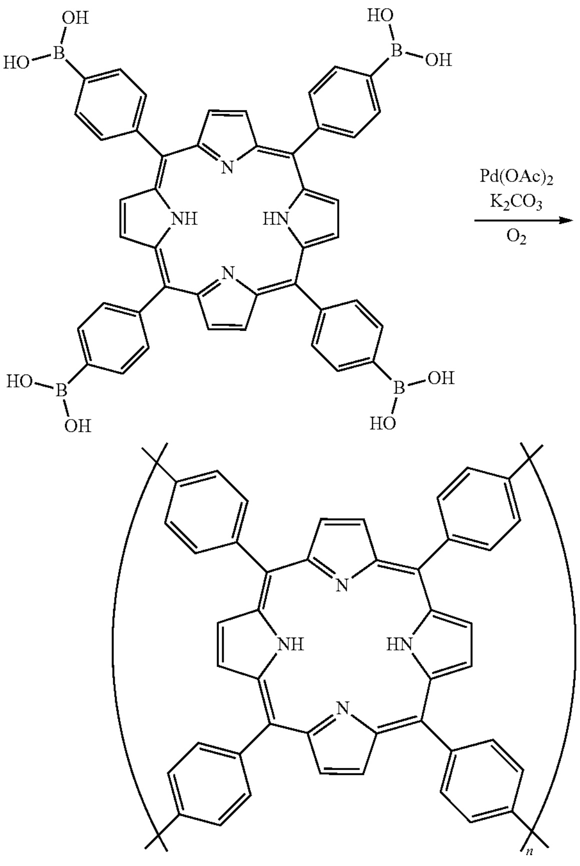

The synthesis was performed in a Teflon® reactor arranged as shown in FIG. 6A. The first reagent was 5,10,15,20-(tetra-4-dihydroxyborylphenyl)porphyrin with pentane as the first liquid phase. The second liquid phase comprised a 19:1 mixture of water:methanol, with two reagents in the aqueous phase, 1.5 mL of 0.2mM $Pd(OAc)_2$ in MeOH and 28.5 mL of a 0.3M $K_2CO_3$. The boronic acid was dissolved in a solvent mixture of chloroform:methanol (3:1 v/v) to form a 0.1 mM solution, which was subsequently dispensed by a syringe pump (New Era Pump System, Inc., NE-1010) into the pentane phase, as shown in FIG. 6A. 10 to 100 μL of the 0.1 mM boronic acid solution was injected over 16 hours. After dispensing, the boronic acid migrated to the interface and homocoupled in the presence of the $Pd(OAc)_2$ catalyst, $K_2CO_3$, and ambient $O_2$ to form a thin film of the homocoupled polymer.

EXAMPLE 6

The following example describes the synthesis of a monolayer 2DP by homocoupling an amine-functionalized porphyrin as shown below:

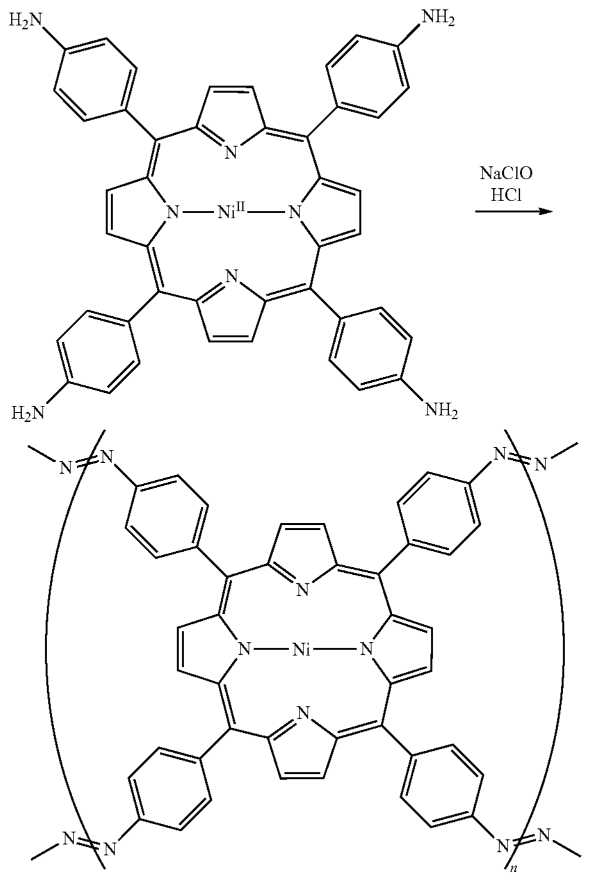

The synthesis took place in a Teflon® reactor arranged as shown in FIG. 6A. The first reagent was 5,10,15,20-tetrakis (4-aminophenyl)-porphyrin nickel(II) (Ni-TAPP) within a first liquid phase of pentane. The second liquid phase was water comprising two reagents: 25 mL of 5.6-6% NaClO (aq) and 5 mL of 0.9 M HCl.

Ni-TAPP was dissolved in a solvent mixture of chloroform:methanol (3:1 v/v) to form a 0.1 mM solution, which was subsequently dispensed by a syringe pump (New Era Pump System Inc., NE-1010) into the pentane phase, as shown in FIG. 6A. 10 to 100 μL of the 0.1 mM Ni-TAPP solution was injected over 16 hours. After the Ni-TAPP was dispensed into the pentane phase, the Ni-TAPP migrated to the interface between the pentane phase and the aqueous phase. Upon reaching the interface, the Ni-TAPP reacted with HCl and NaClO to form a thin film through an azo-coupling reaction.

EXAMPLE 7

The following example describes the synthesis of a monolayer 2DP using GNR precursors that form graphene nanoribbons (GNR) as shown below:

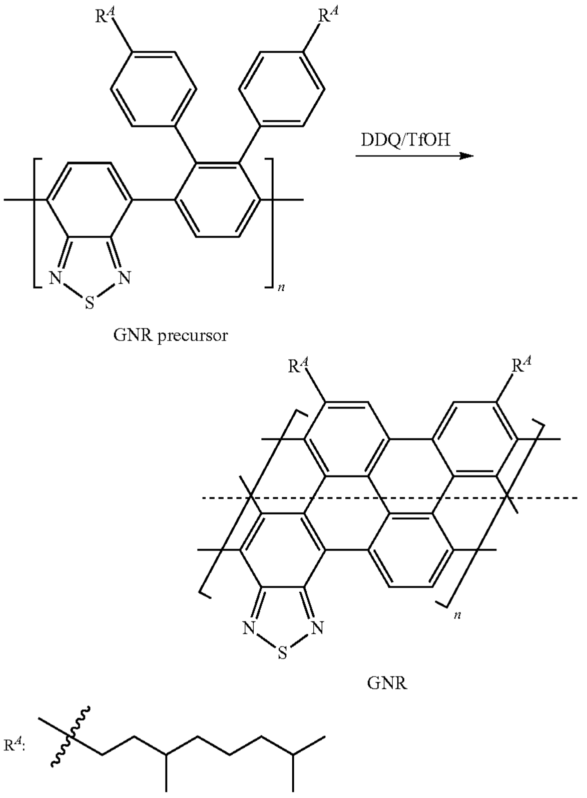

The synthesis was performed in a Teflon® reactor arranged as shown in FIG. 6A. The second liquid phase was nitromethane with second and third reagents 50 mM DDQ (2,3-dichloro-5,6-dicyano-1,4-benzoquinone) and 1 v/v% TfOH (triflic acid), respectively. The first liquid phase was 5-10 mL of pentane, which was layered on top of the nitromethane. The GNR precursor described in the above equation was used as the first reagent. The GNR precursor was dissolved in chloroform, which was subsequently dispensed by a syringe pump (New Era Pump System Inc., NE-1010) into the pentane phase, as shown in FIG. 6A. 10 to 100 μL of the 0.1 mM graphene precursor solution was injected over 16 hours. After the GNR precursor was dispensed into the pentane phase, the GNR precursor migrated to the interface between the pentane phase and the nitromethane. Once the GNR precursor reached the interface, the GNR precursor reacted with DDQ and TfOH to form a thin film with a graphene nanoribbon structure.

EXAMPLE 8

The following example describes the synthesis of a monolayer 2DP through metal-ligand coordination bonds as shown below:

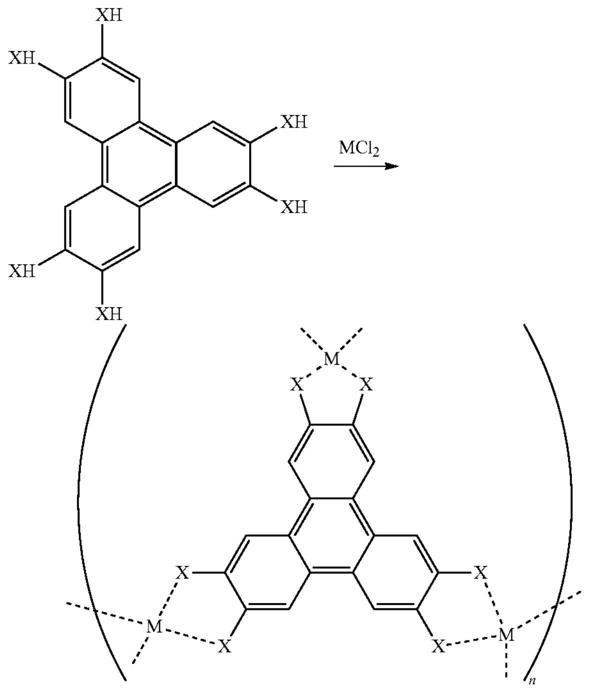

X = O, S, NH M = $Cu^{2+}$, $Ni^{2+}$, $Co^{2+}$, $Fe^{3+}$

The synthesis took place in a Teflon® reactor arranged as shown in FIG. 6A. The first reagent was functionalized triphenylene precursor, which can be 2,3,6,7,10,11-hexahydroxytriphenylene (X=O), or 2,3,6,7,10,11-triphenylene-hexathiol (X=S), or 2,3,6,7,10,11-hexaaminotriphenylene (X=NH), within a first liquid phase of pentane. The second phase and second reagent were supplied by a 0.1 mM aqueous solution of $CuCl_2$, or $NiCl_2$, or $CoCl_2$, or $FeCl_3$. Solubilized $Cu^{2+}$, or $Ni^{2+}$, or $Co^{2+}$, or $Fe^{3+}$ was used as the second reagent, and water served as the second phase.

The first reagent was first dissolved in a solvent mixture of dimethylformamide:chloroform (1:3,v/v) to form a 0.1 mM solution, which was subsequently dispensed via a syringe pump (New Era Pump System Inc., NE-1010) into the pentane phase. After the first reagent was dispensed into the pentane phase, the functionalized triphenylene precursor migrated to the interface between the pentane phase and the aqueous phase, illustrated schematically in FIG. 6B. 4 mL of 1 mM aqueous solution of $CuCl_2$, or $NiCl_2$, or $CoCl_2$, or $FeCl_3$ was injected over 1 hour. After dispensing, the concentration of solubilized $Cu^{2+}$, or $Ni^{2+}$, or $Co^{2+}$, or $Fe^{3+}$ in the second phase is 0.1 mM. The functionalized triphenylene precursors reacted with the solubilized metal cations to form two-dimensional polymer.

EXAMPLE 9

This example describes the characterization of the monolayers of 2DP-I, 2DP-II, 2DP-III, and 2DP-IV produced according to Examples 1-4.

Figure 4B:
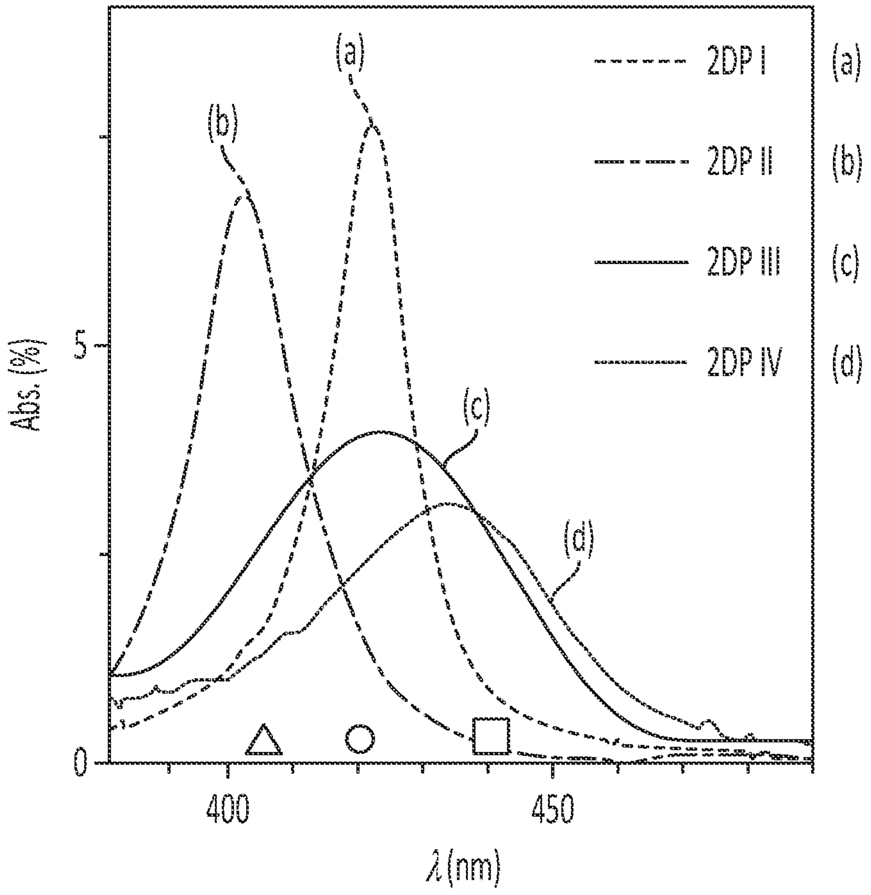
FIG. 4B is a plot of absorbance as a function of wavelength, illustrating the tuning of optical spectra of four two-dimensional (2D) polymer monolayers (2DP-I, 2DP-II, 2DP-III, and 2DP-IV), according to one set of embodiments.
Figure 4C:
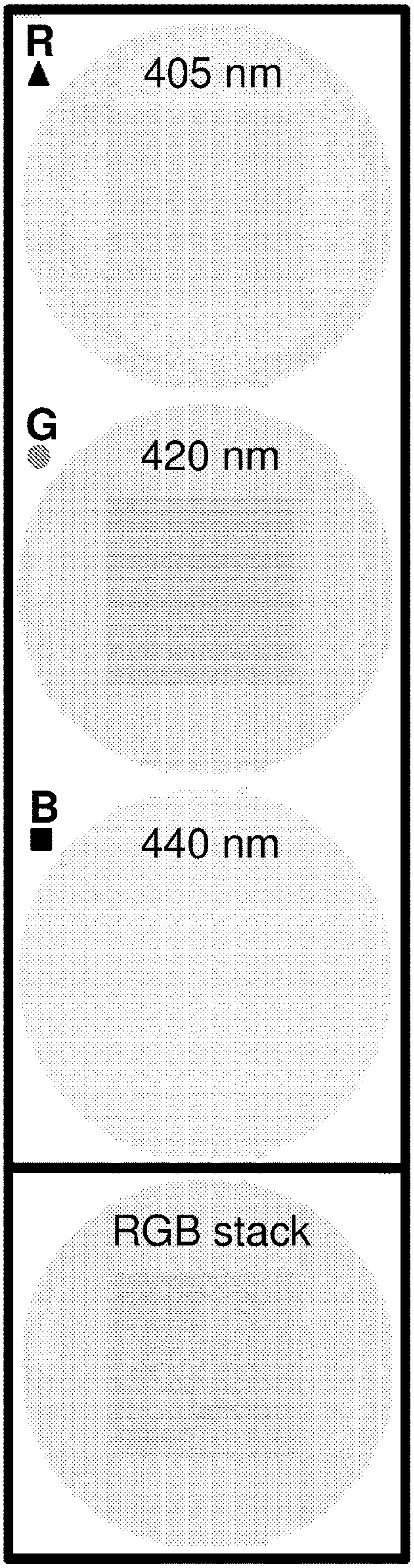
FIG. 4C is a set of hyperspectral optical transmission images of a series of 2D polymer monolayers, according to some embodiments.
Figure 4D:
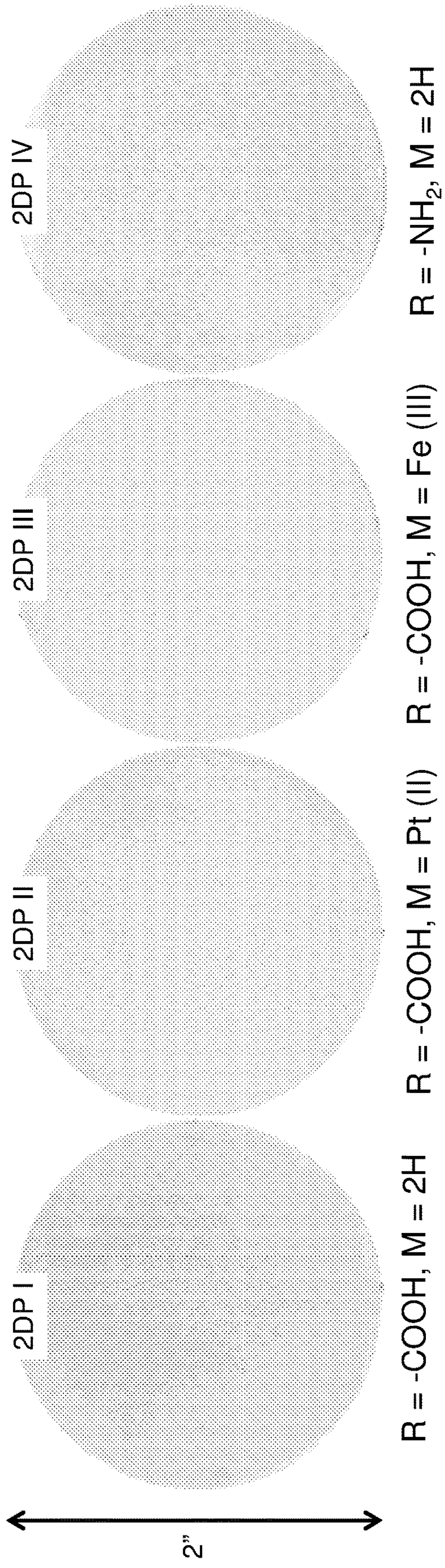
FIG. 4D is a series of images of four transferred 2D polymer monolayers that cover an entire 2-inch fused silica substrate, according to one set of embodiments.

FIG. 4D shows images of the four transferred 2DP monolayers covering an entire 2-inch fused silica substrate. The films were visualized using a custom coding scheme based on the hyperspectral optical transmission images as shown in FIG. 4C at different excitation wavelengths. These films displayed a uniform contrast over the entire wafer, suggesting macroscopic continuity and homogeneity. 2DP-I and 2DP-IV each have no metal present in the porphyrin binding pocket, but each has different substituents off the phenyl ring. 2DP-II and 2DP-III each comprise different metals in the porphyrin binding pocket. Accordingly, 2DP-I, 2DP-II, 2DP-III, and 2DP-IV each of have distinct absorption spectra, shown in FIG. 4B, resulting in markedly different colors as shown in FIG. 4D (with the 2DP-I film being violet, the 2DP-II film being blue, 2DP-III film being lavender, and 2DP-IV film being gray). The absorption spectra of the 2DPs resembles those of the corresponding porphyrin monomers indicating that the optical properties of the 2DP films can be directly tuned at the molecular level.

Figure 5A:
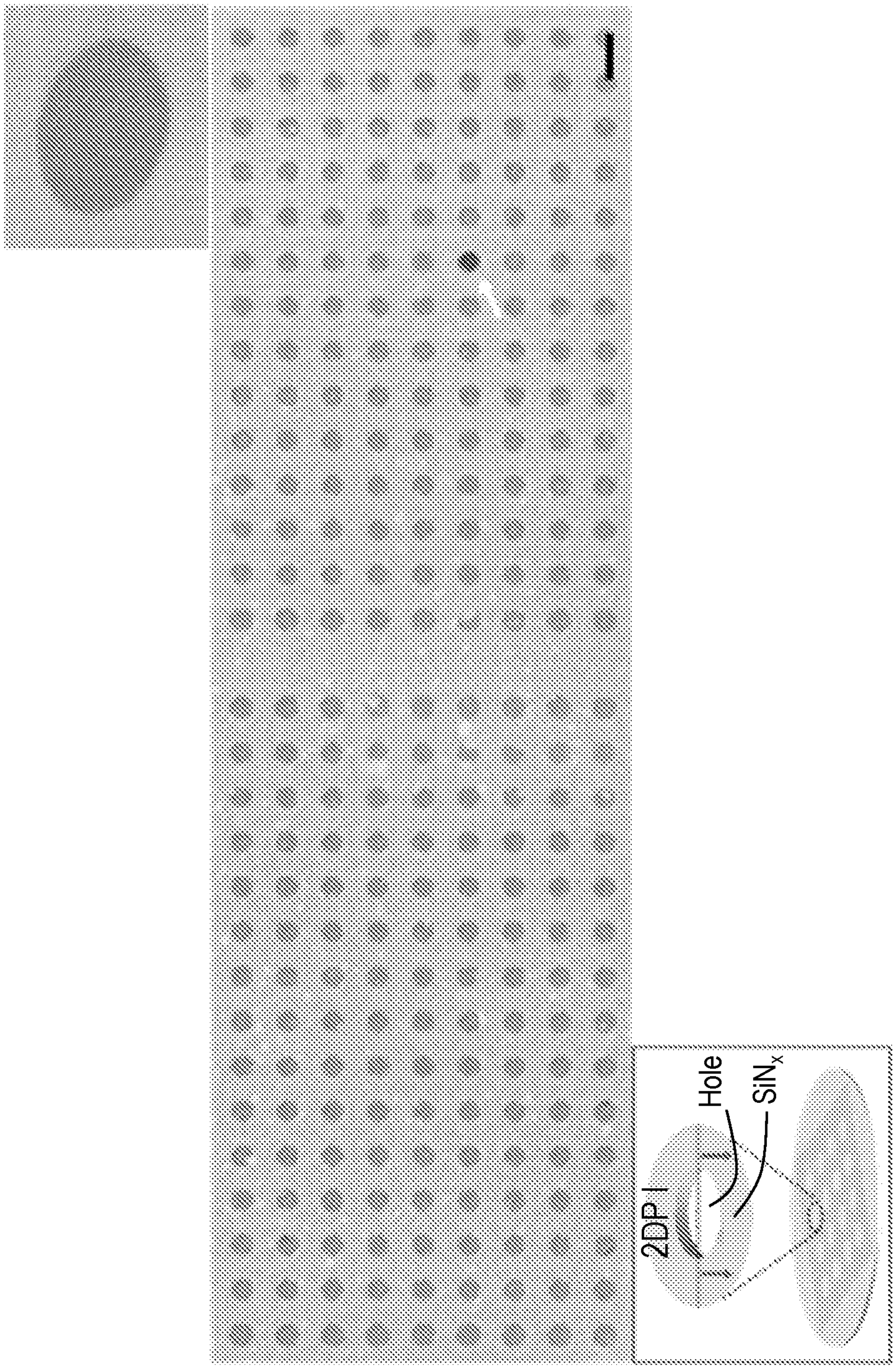
FIG. 5A is a scanning electron microscopy (SEM) image of a 2D polymer monolayer transferred and suspended over a transmission electron microscope (TEM) grid, according to one embodiment.
Figure 5B:
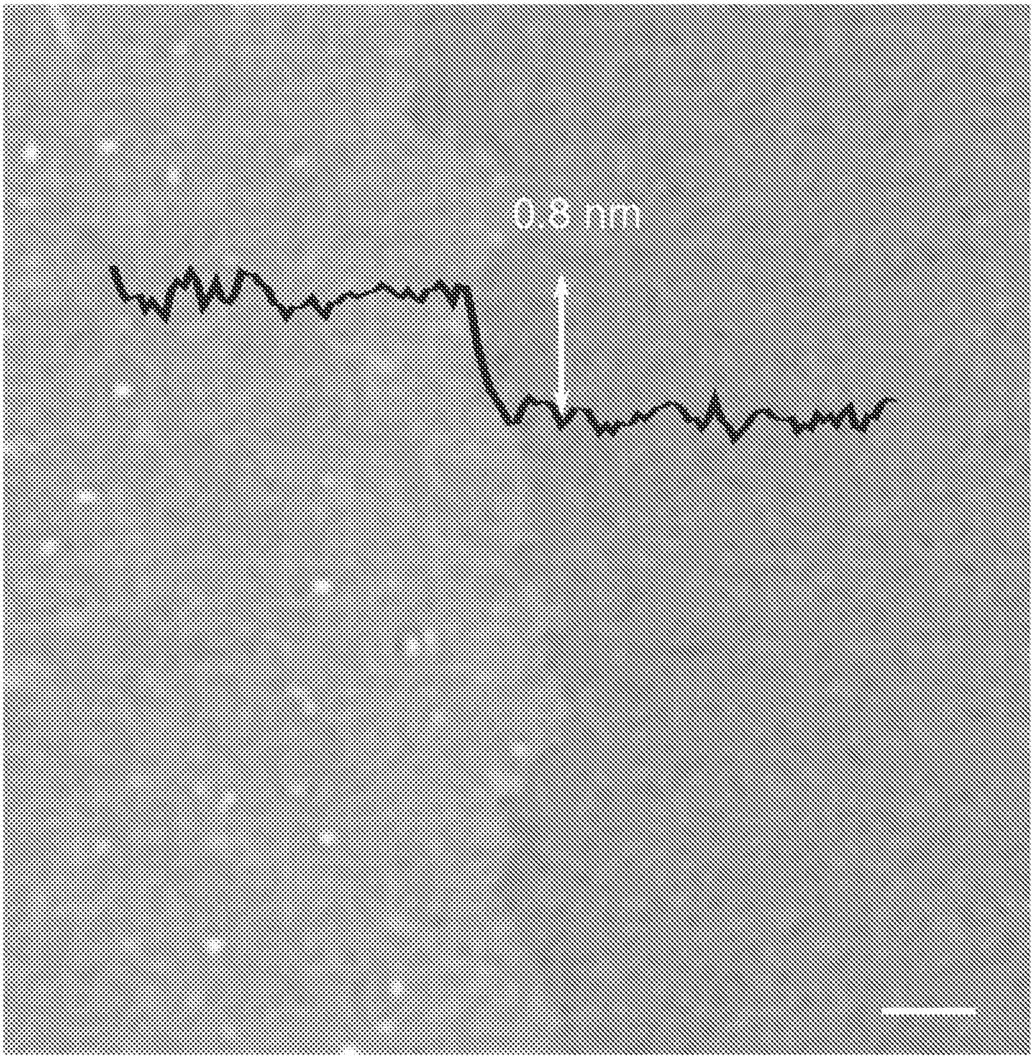
FIG. 5B is an atomic force microscope (AFM) image showing the film thickness of a 2D polymer monolayer, according to one embodiment.

The polycrystalline 2DP films are homogeneous and mechanically robust. On the large scale, they exhibit considerable mechanical strength and can be transferred onto various substrates as continuous films as illustrated in at least FIGS. 4D and 5A. FIG. 5A, for example, shows a scanning electron microscopy (SEM) image of the 2DP-I film transferred and suspended over a holey transmission electron microscope (TEM) grid with 2 μm diameter holes. As shown in FIG. 5A, an array of freestanding 2DP membranes were suspended with a near perfect yield (>99%; one broken membrane denoted by an arrow) and appeared uniform and continuous over the entire area without cracks or voids. These 2DP films were approximately 0.8 nm in thickness, close to the expected thickness of a monolayer. The 2DP films had a uniform and smooth surface as measured by atomic force microscopy, shown in FIG. 5B (in which the inset corresponds to the height profile of the thin film).

Figure 5C:
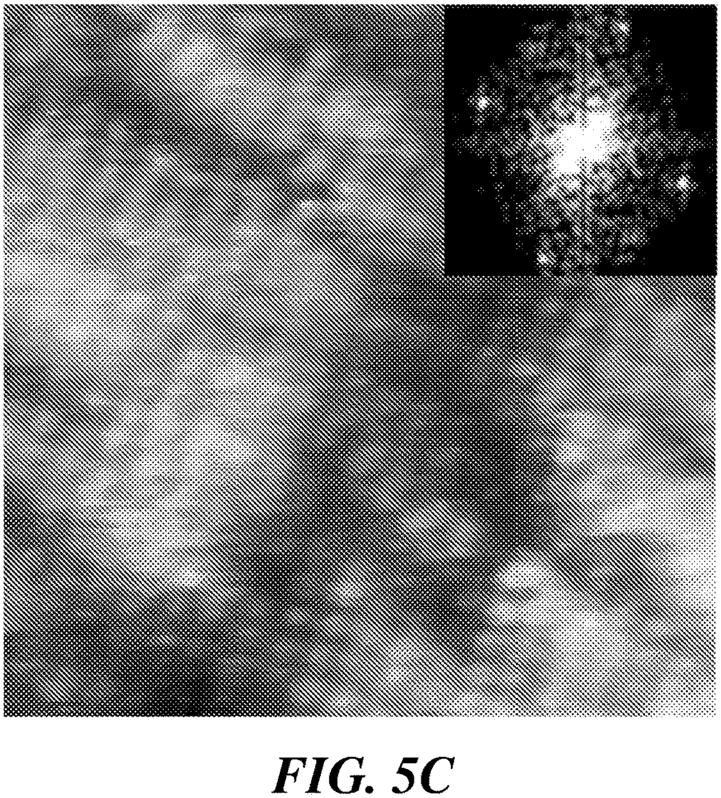
FIG. 5C is a scanning tunneling microscope (STM) topography image showing a square lattice with a single crystalline domain that fully covers 30 nm by 30 nm area and a 2D fast Fourier transform (FFT) image, according to one embodiment.
Figure 5D:
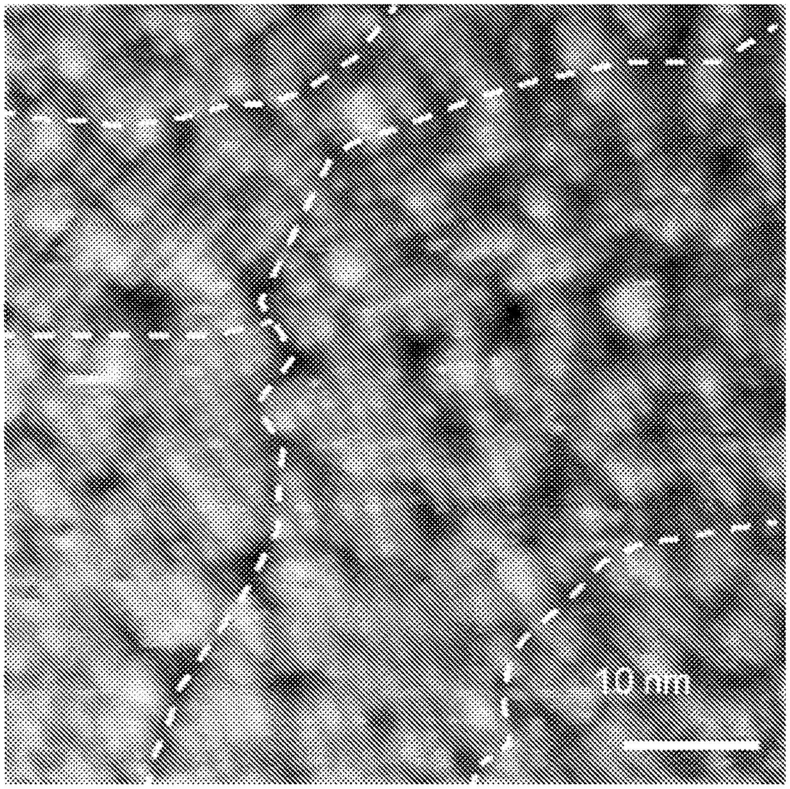
FIG. 5D is an STM image (60 nm by 60 nm) of a 2D polymer monolayer having three primary crystalline orientations, demonstrating that the 2D polymer monolayer is polycrystalline, according to some embodiments.
Figure 5E:
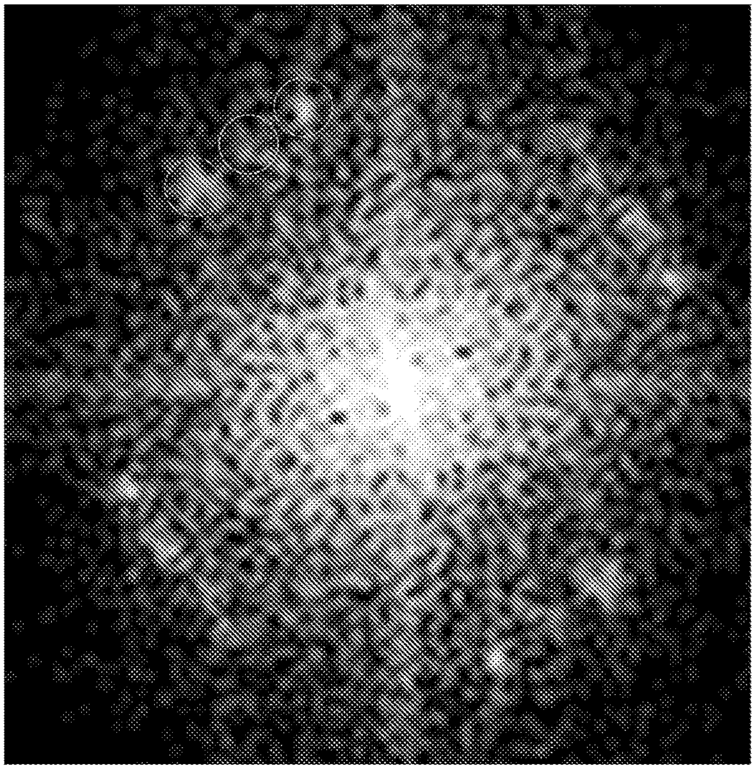
FIG. 5E is a 2D fast Fourier transform (FFT) image based on FIG. 5D, from which the lattice constants of three primary crystalline orientations were measured, according to one set of embodiments.
Figure 5F:
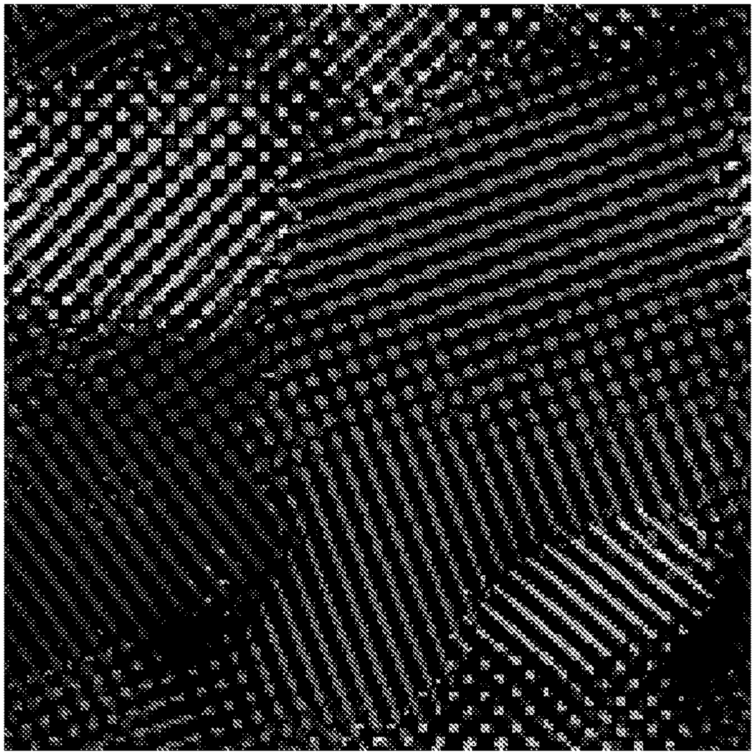
FIG. 5F is a composite inverse 2D FFT image where each region is shaded according to its crystal lattice orientation, according to one set of embodiments.

The crystalline structure of the 2DP films was confirmed using scanning tunneling microscopy (STM), which was performed under ultra-high vacuum on flat gold surfaces. The STM topography image of the 2DP-II film, shown in FIG. 5C, clearly showed a square lattice with a single crystalline domain that fully covered the 30 nm by 30 nm area. Another STM image of the 2DP-II film, shown in FIG. 5D, displayed three primary crystalline orientations (lattice constant a=1.66±0.03 nm, measured from FIG. 5E), suggesting the polycrystalline structure of the 2DP films. The observation of mechanically freestanding films in FIG. 5A implied that the polycrystalline domains stitched to each other to form a monolayer patchwork quilt, similar to polycrystalline graphene. This observation is supported by the 2D FFT image in FIG. 5F (which is based on the FFT image in FIG. 5E), in which each region is shaded according to the lattice orientation. This map was used to estimate the size of domains (between 10 and 40 nm) and locate domain boundaries (marked by the dashed lines in FIG. 5D).

Figure 5G:
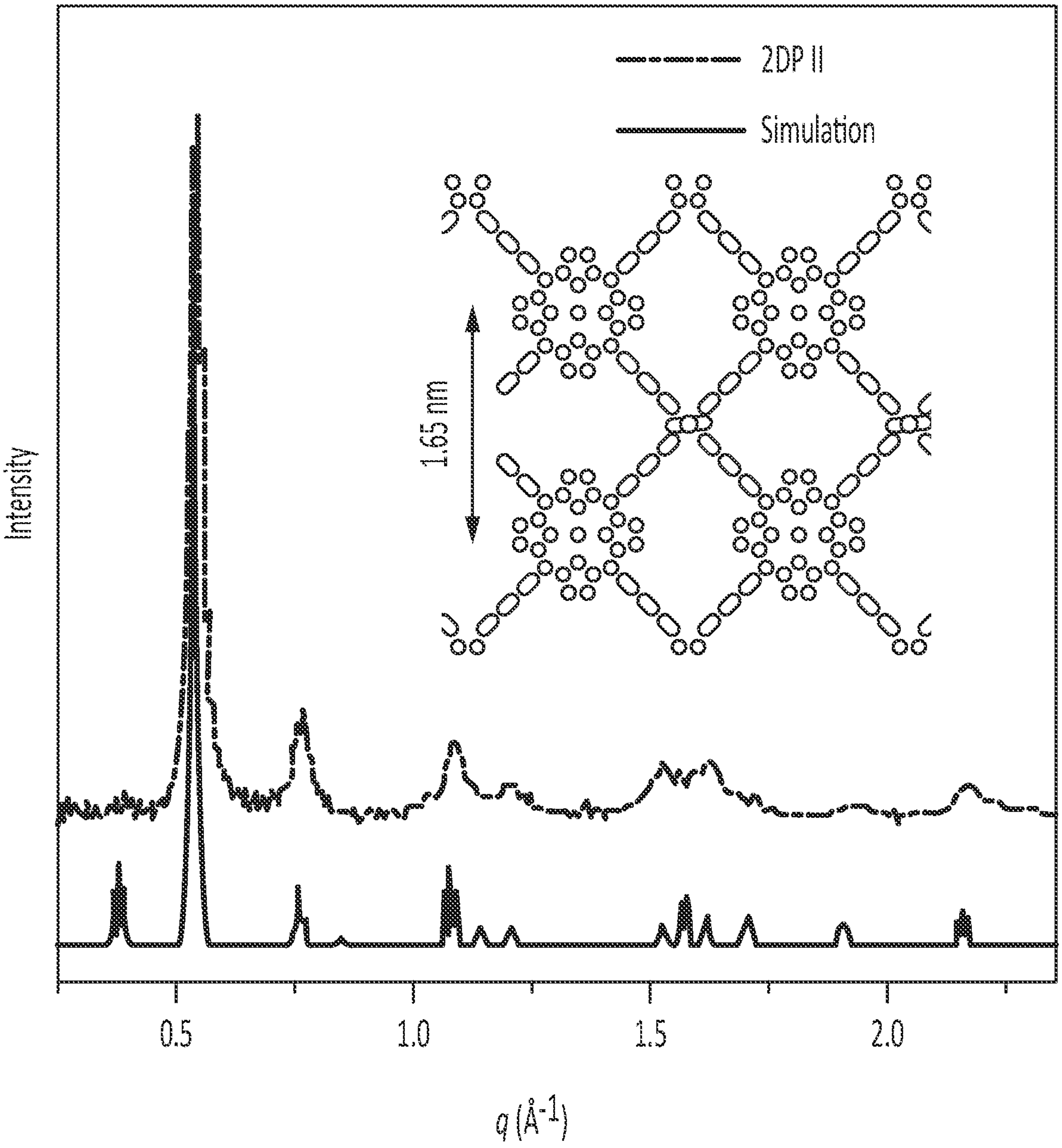
FIG. 5G is a non-limiting example of a diffractogram comparing an experimental GIXRD measurement of 2DP-II with a simulated model.

The lattice constant and average domain size extracted from these microscopic analyses matched well with grazing incident X-ray diffraction (GIXRD) measurements performed on the macroscopic scale, shown in FIG. 5G. A simulated x-ray diffraction pattern for 2DP-II was produced as described in Example 10. Comparison of this measurement to the simulated XRD pattern for 2DP-II showed that all the main peaks predicted based on the structure model, shown in FIG. 5G, and the peak broadening observed in the GIXRD spectrum corresponded to an average domain size of ~20 nm. These results provided comprehensive evidence for the inch-scale synthesis of a continuous and uniform monolayer 2DPs with molecular-level tunability. The results also confirm that the 2DP monolayers meet all known criteria for 2D polymers: they are built with flat monomers linked by robust chemical bonds; they are crystalline; and they are one-molecule-thick, freestanding films.

EXAMPLE 10

This example describes the simulation of x-ray diffraction patterns for 2DPs.

A simulated x-ray diffraction pattern for 2DP-II was calculated for comparison to the GIXRD measurements using the following method:

The XRD simulation was based on a general 2D lattice scattering model. The scattering intensity from a crystalline material can be written in general as $$F^{crystal}(Q) = \sum_{l}^{All\ atoms} f_l(Q)e^{iQ\cdot r_l}$$

where Q was the scattering vector and $f_l$ (Q) was the atomic form factor of the atom situated at position $r_l$.

The periodicity of a crystalline materials was expressed as $$r_l=r_n+r_j$$

where $r_n$ was a lattice vector and $r_j$ labels the position of an atom within the unit cell. The structure factor of a crystalline material were decomposed into two parts based on its periodicity $$F^{crystal}(Q) = \sum_{l}^{All\ atoms} f_l(Q)e^{iQ\cdot r_l} = \overbrace{\sum_n e^{iQ\cdot r_n}}^{lattice}\ \overbrace{\sum_j f_j(Q)e^{iQ\cdot r_j}}^{unit\ cell}$$

The first term was a sum over the lattice in the crystal, while the second was over basis of atoms known as unit cell structure factor. Diffraction peaks appeared when $$Q\cdot r_n=2\pi\times\text{integer}$$

The monolayer 2DPs generally had a 2D square lattice with unit cell vectors a and b, where |a|=|b| and a·b=0. Then $r_n=n_1a+n_2$ b, where $n_1$ and $n_2$ were integers. To find a solution to the above condition, it was convenient to introduce the reciprocal lattice $$a^* = \frac{2\pi Rb}{a\cdot Rb}$$

$$b^* = \frac{2\pi Ra}{b\cdot Ra}$$

where R is a 90-degree rotation matrix. Monolayer 2DPs had a 2D square lattice in the 3D space, thus, the resulting reciprocal lattice was a 2D square array of infinite rods due to the vanishing z coordinates in the real space.

The reciprocal lattice vector G was $$G=ha^*+kb^*$$

The Laue condition for X-ray diffraction:

$$Q=G$$

determined possible positions of a diffraction peak:

$$q_{h,k}=|Q|=|a^*|\sqrt{h^2+k^2}$$

and the intensity of that peak was proportional to:

$$F^{unit}(q_{h,k})=\Sigma_j f_j(q_{h,k})e^{i2\pi(hx_j+ky_j)}$$

In the simulation process, a Dirac-Delta function was generated at every position that satisfies the Laue condition. Convolution of the Dirac-Delta function, the intensity profile derived from the unit cell structure factor, and other geometry-related factors gave the overall simulated GIXRD pattern of the 2DPs.

Fractional coordinates of all atoms in the 2DPs unit cell was extracted from a crystallographic information file of a corresponding 3D structure composed of stacked 2D layers that had same structures as the 2DPs synthesized in Examples 1-4.

Next, the Lorentz factor (L), polarization term (P) and temperature effect ($f_T$) were taken into consideration for the diffraction intensity profiles $$L = \frac{1}{\sin\theta\times\sin 2\theta}$$

$$P = \frac{1+\cos^2 2\theta}{2}$$

$$f_T = e^{-\frac{B\sin^2\theta}{\lambda^2}}$$

where $$\theta = \arcsin\left(\frac{q\lambda}{4\pi}\right)$$

and B was the temperature factor related to motion of individual atoms.

The overall scattering intensity profile of the monolayer was thus $$I(q) = \frac{1}{\sin\theta\times\sin 2\theta}\times\frac{1+\cos^2 2\theta}{2}\times e^{-\frac{B\sin^2\theta}{\lambda^2}}\times\sum_{h,k}\delta(q-q_{h,k})\times\left|F^{unit}(q)\right|^2.$$

EXAMPLE 11

This example describes the fabrication of 2DP lateral heterostructures. The polymers described in at least Examples 1-3 are suitable as components in the 2DP lateral heterostructures described below.

Figure 6F:
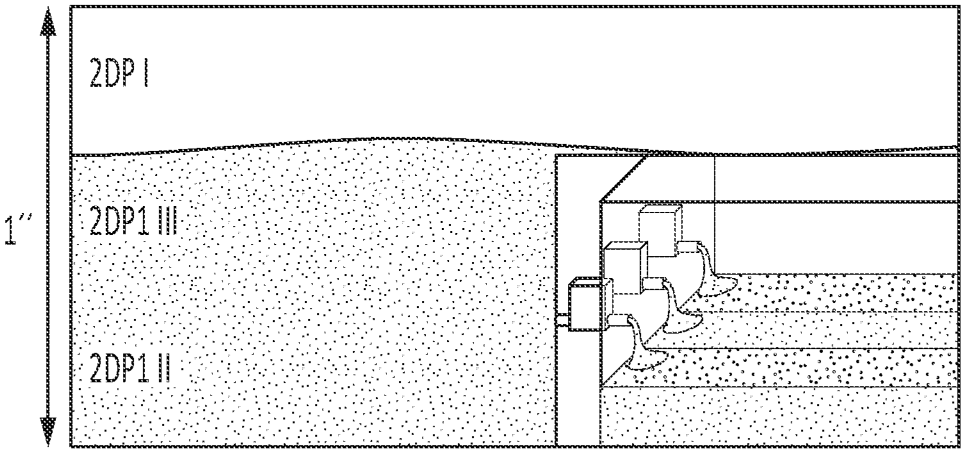
FIG. 6F depicts the laminar flow during monolayer assembly in a direction parallel to the sidewall, with little mixing perpendicular to this direction during the preparation of a lateral hetero structure, according to one set of embodiments.
Figure 6G:
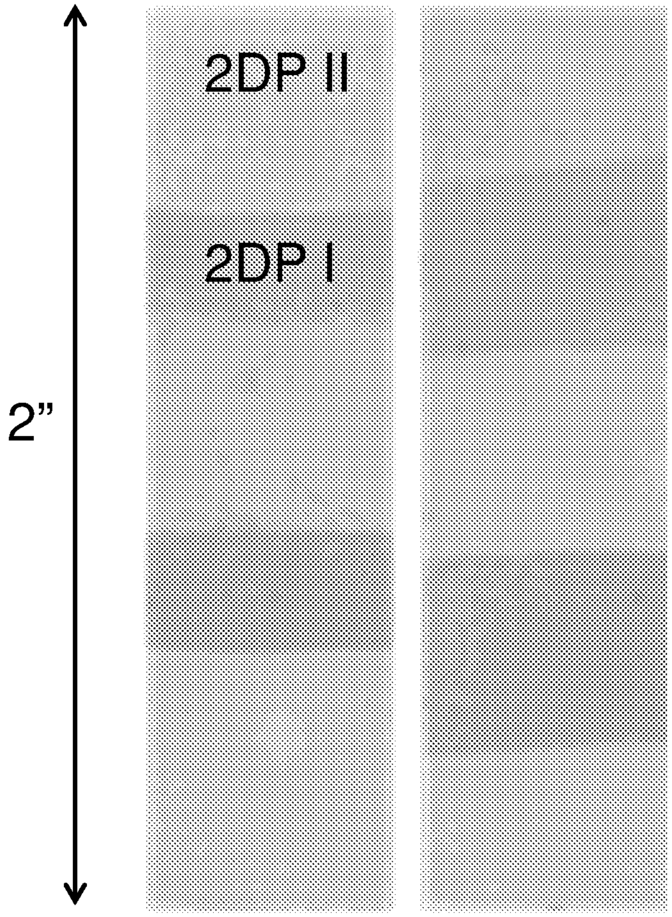
FIG. 6G shows images of 2DP-I and 2DP-II with lateral junctions on a single film with tunable stripe widths, according to one set of embodiments.

Thin films containing lateral heterojunctions of 2DPs can be grown with tunable compositions and widths by introducing different monomers from each nozzle of a multi-nozzle system (see, e.g., FIGS. 1D and the inset of FIG. 6F) and by controlling the relative injection rates of the reagents. As an illustration, FIG. 6G shows a thin film comprising a lateral heterojunction of 2DP-I and 2DP-III. The 2DP lateral heterostructure was synthesized in both 1×5 inch and 2×5 inch reactors. A multi-channel syringe pump (New Era Pump System Inc., NE-1800) was used to inject different reagents at the same rate and volume, schematically depicted in the inset of FIG. 6F. In this example, each of the subcomponents of the lateral heterostructures were the same width. Three injection nozzles were employed to introduce the porphyrin-based organic precursors in a 1-inch by 5-inch reactor with individual rate of 5 μL/min. For the three nozzles, 2H-TCPP, Fe-TCPP, and Pt-TCPP were used as reagents. The first liquid phase was pentane. The second liquid phase and associated reagent were supplied by a 1 mM aqueous solution of $Cu(NO_3)_2$, with water serving as the second phase and $Cu^{2+}$serving as the reagent used to polymerize the TCPP precursors. Upon injecting the 2H-TCPP, Fe-TCPP, and Pt-TCPP reagents into the first liquid phase (FIG. 6F), the reagents migrated to the interface and reacted with the $Cu^{2+}$ions from the $Cu(NO_3)_2$. The resulting monolayer 2DP comprised lateral bands of 2PD-I, 2DP-III, and 2PD-II, seen in the main portion of FIG. 6F. The minimal mixing between the bands in FIG. 6F is believed to have been due to the laminar flow of the delivered reagents. In addition, the lateral dimensions of the bands could be tuned by altering the flow rates of the delivered reagents.

EXAMPLE 12

Figure 9:
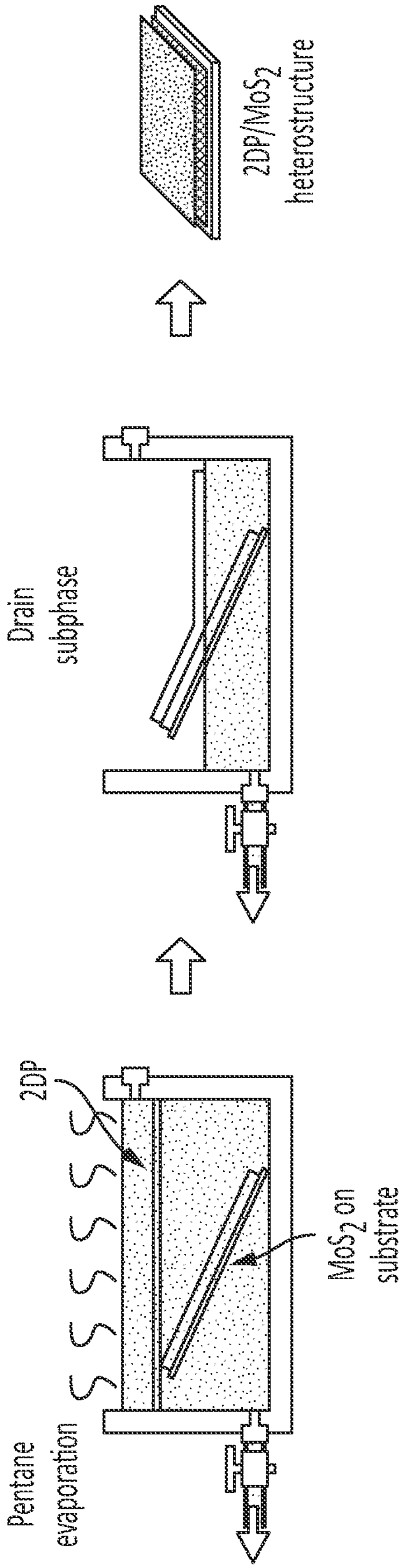
FIG. 9 is a series of cross-sectional schematic illustrations showing a method of fabricating 2DP/$MoS_2$ bilayer heterostructures on a substrate, according to some embodiments.
Figure 10:
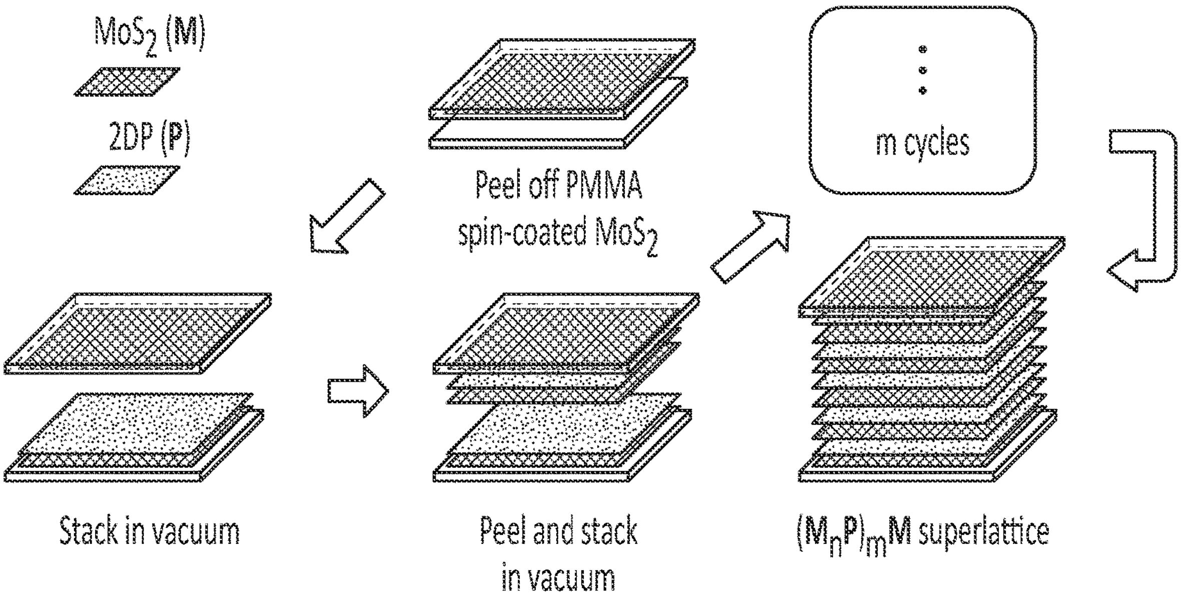
FIG. 10 shows a schematic of fabricating different 2DP/$(MoS_2)_n$ superlattices, according to some embodiments.

This example describes the fabrication of the composite material 2DP/$MoS_2$ van der Waals superlattices. Schematic illustrations of the superlattice preparation process are provided in FIG. 9 (showing the arrangement of a 2DP material on $MoS_2$ arranged on a substrate) and FIG. 10 (showing a scheme for arranging multiple layers of $MoS_2$ and 2DP materials).

Wafer-scale monolayer films of $MoS_2$ were synthesized using metal organic chemical vapor deposition (MOCVD) based on known techniques. A piece of as-grown monolayer $MoS_2$ film or a vacuum-stacked $MoS_2$ film was placed onto the subphase before growth. A 2DP-II synthesis, as described in Example 2, was then carried out and the as-synthesized monolayer 2DP film was transferred onto the $MoS_2$ film by draining the subphase (See FIG. 9), resulting in a 2DP/$MoS_2$ heterostructure.

To make various van der Waals superlattices with 2DP/$MoS_2$ heterostructures and as-grown monolayer $MoS_2$ films, the fabrication started from an initial layer of $MoS_2$ ($L_0$). PMMA A8 (Poly-methyl methacrylate, 495 K, 4% diluted in anisole) was spin-coated onto the as-grown $MoS_2$ at 2800 rpm for 60 seconds. The sample was then heated at 180° C. for 2 mins on a hot plate. A piece of thermal release tape (TRT, manufactured by Nitto-Denko, 3195MS) was applied onto the sample and mechanically peeled off the growth substrate with PMMA and $L_0$ on it. The fabricated TRT/PMMA/$L_0$ was mounted onto the top pressor of a vacuum stacking apparatus. Another as-grown monolayer $MoS_2$ film or 2DP/$MoS_2$ heterostructure film was placed on the bottom stage of the vacuum chamber which was maintained at 100° C. The vacuum chamber was then evacuated to less than 100 mTorr, and the pressor was lowered through a linear motion vacuum feed-through to bring TRT/PMMA/$L_0$ into contact with the film on the bottom stage. The resulting stack was taken out from the vacuum chamber and heated at 120° C. under ambient condition to release the TRT. A new TRT was then used to mechanically detach the whole stack from the growth substrate. Deionized water was dropped around the substrate to facilitate this peeling process. Iteration of the vacuum stacking and peeling process, with as-grown $MoS_2$ and 2DP/$MoS_2$ heterostructure films generated stacked films of arbitrary layer number, designed periodicity, and altered composition. The top PMMA layer was removed following the final stacking step by soaking in chloroform overnight at room temperature.

2DP-II was used to make stacked heterostructures along with $MoS_2$ (as prepared above). The superlattices are produced by repeatedly stacking in vacuum hybrid 2D building units of 2DP/$(MoS_2)_n$, each made of a 2DP-II monolayer and n monolayers of $MoS_2$.

Figure 7A:
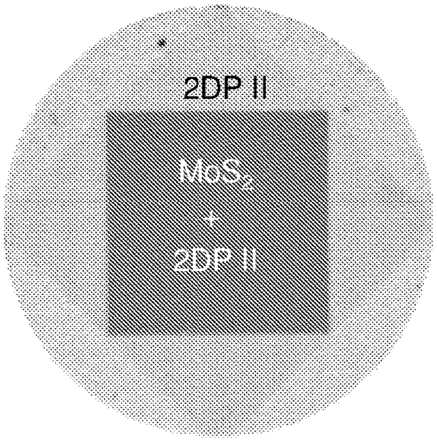
FIG. 7A shows an image of a patterned 2DP II/$MoS_2$ film, according to one set of embodiments.

FIG. 7A shows an example of a 2DP-II/$MoS_2$ heterostructure on fused silica.

Figure 7B:
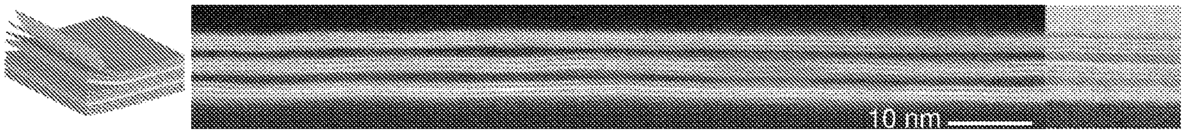
FIG. 7B shows a cross-sectional annular dark field (ADF) scanning transmission electron microscope (STEM) image of a 2DP-II/$(MoS_2)_3$ superlattice, according to some embodiments.

FIG. 7B shows an example of a 2DP-II/$(MoS_2)_3$ superlattice. The superlattice in FIG. 7B is an 11-layer stack, constructed by alternating one layer of 2DP-II and three layers of $MoS_2$. The image clearly shows three bright bands separated by two dark lines. Each of the bright bands consists of three layers of $MoS_2$ and the dark layer in between corresponds to a 2DP-II monolayer, as was confirmed by composite ADF and electron energy loss spectroscopy (EELS) mapping. In FIG. 7B, the films run parallel to each other with sharp interfaces and uniform layer thickness over the entire 100 nm view of the image, indicating a high level of uniformity.

Figure 7C:
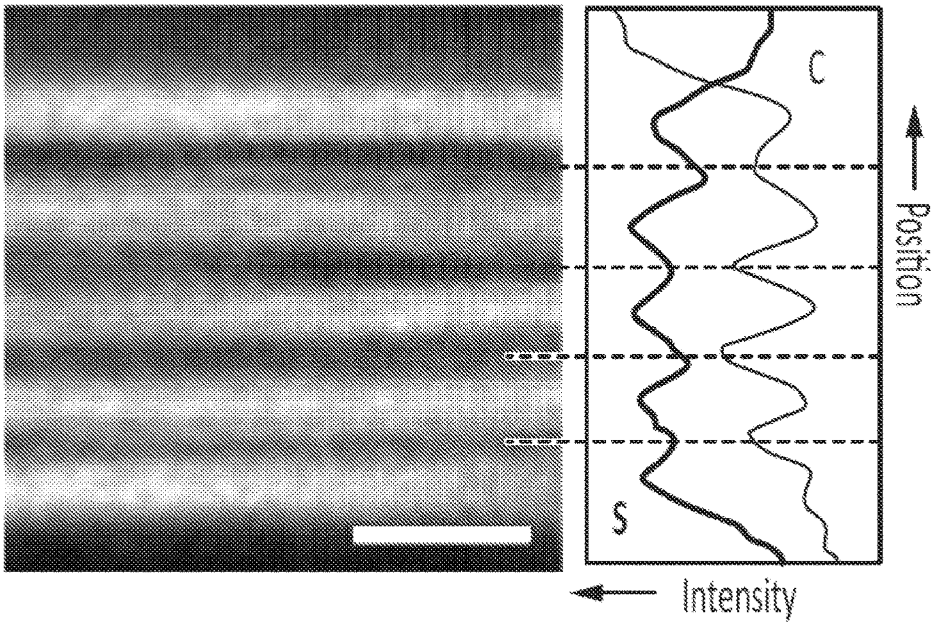
FIG. 7C is a STEM image of another 2DP III/$(MoS_2)_2$ superlattice, according to one embodiment.

In addition, the composition of the superlattice was varied by using a different 2DP as demonstrated by another 2DP-III/$(MoS_2)_2$ superlattice shown in FIG. 7C. The left-hand side of FIG. 7C shows cross-sectional ADF STEM image of a 2DP III/$(MoS_2)_2$ superlattice film transferred onto a $SiO_2$/Si substrate. In FIG. 7C, each bright layer consists of 2 layers of stacked $MoS_2$, and each dark layer is a 2DP-III monolayer. The right-hand side of FIG. 7C includes electron energy-loss spectroscopy (EELS) profiles of carbon and sulfur taken from a different area on the sample.

Figure 7D:
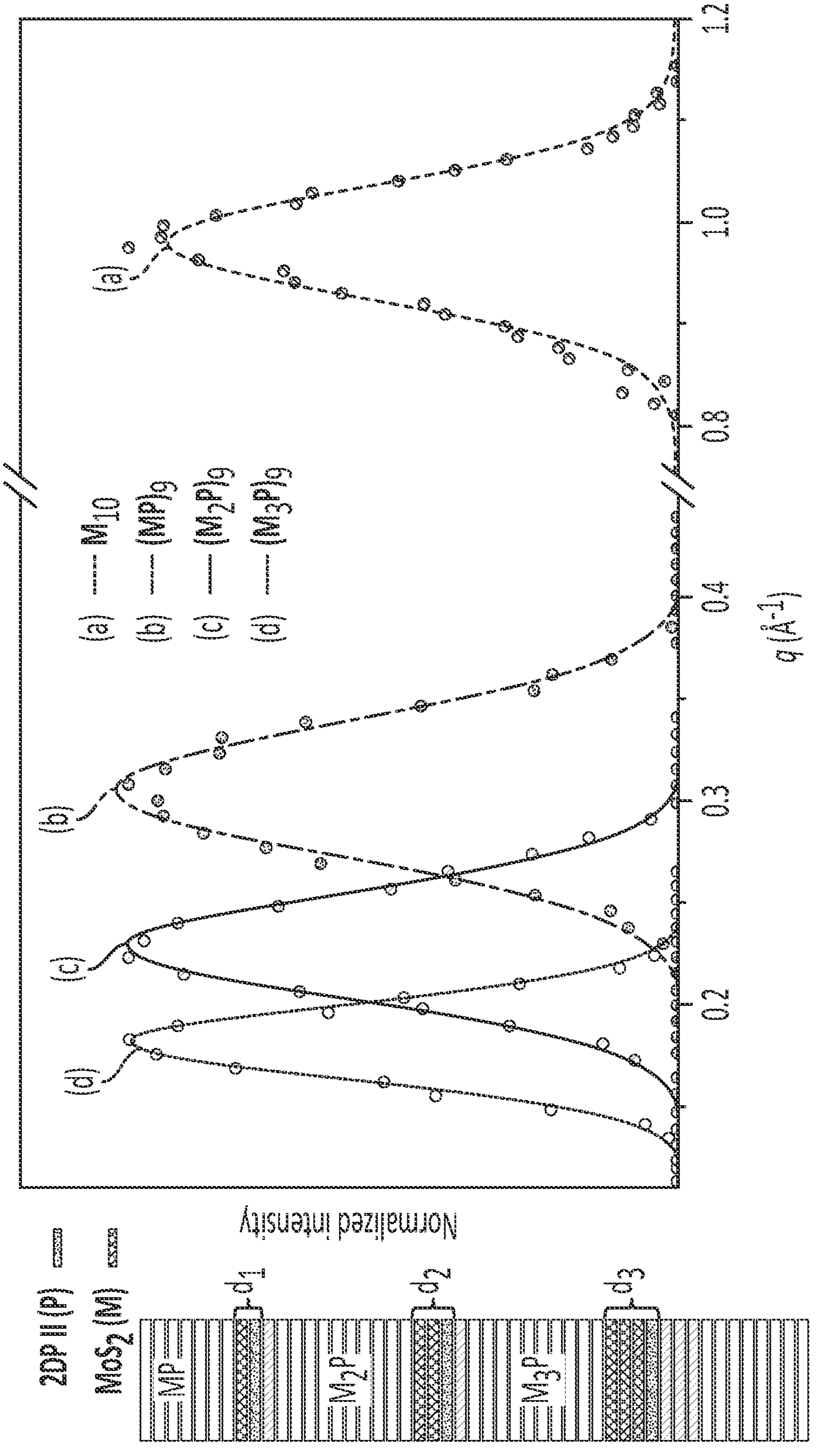
FIG. 7D shows a series of vdW superlattices with varied superlattice periodicity d made of 2DP-II/$(MoS_2)_n$ repeating units, where n varies from 1 to 3, according to one set of embodiments.

The periodicity of the superlattice could be varied, as shown in FIG. 7D. The left-hand side of FIG. 7D shows a series of vdW superlattices with varied superlattice periodicity d made of 2DP-II/$(MoS_2)_n$ repeating units, where n varies from 1 to 3. The grazing incidence wide-angle X-ray scattering (GIWAXS) data presented in the right-hand side of FIG. 7D shows a unique diffraction peak for each superlattice in reciprocal space, which is used to measure d. For example, the superlattice with n=3 shows d=3.5 nm and a vdW thickness of 1.5 nm for 2DP-II, close to the value measured from FIG. 7B.

EXAMPLE 13

The following example describes the fabrication of a device using a monolayer 2DP.

Figure 7E:
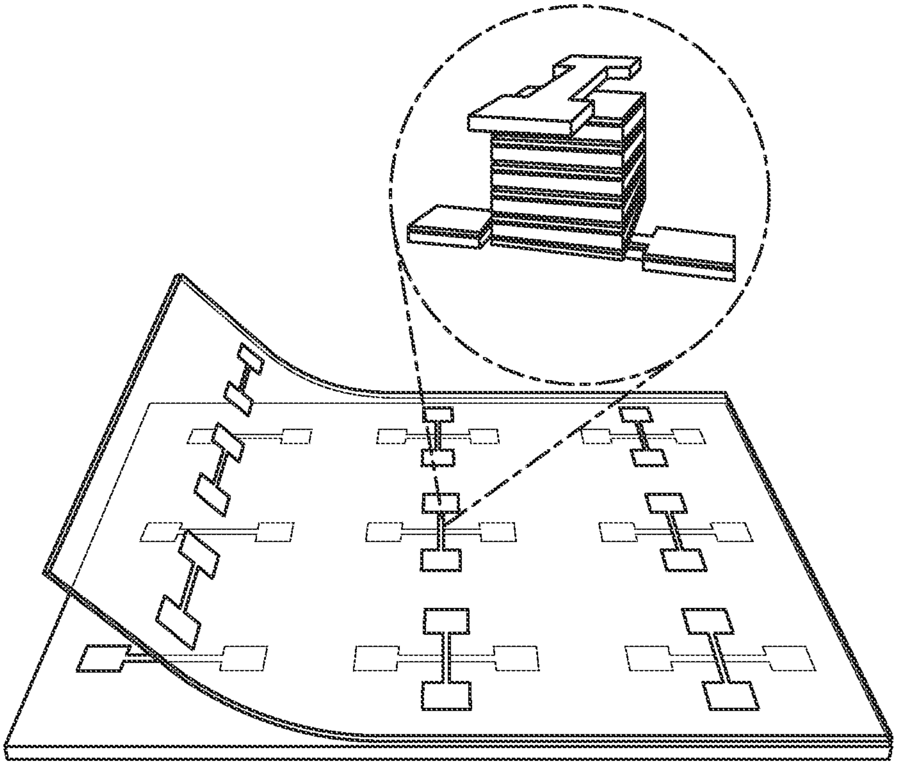
FIGS. 7E-7F show an array of electrical capacitors fabricated using vdW heterostructures of 2DP and $MoS_2$, according to some embodiments.
Figure 7F:
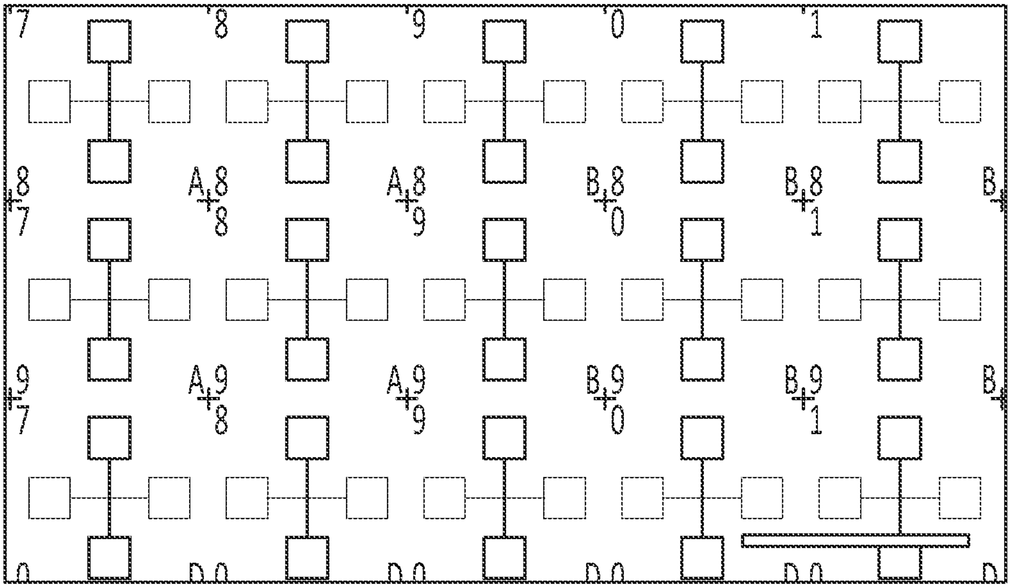

Monolayer 2DPs may be fabricated into devices, for example, for storing energy. Devices were fabricated to measure the capacitance of a monolayer 2DP. As an example, a device was formed using $MoS_2$ (as described in Example 12) and 2DP-II of Example 2. The device geometry is shown in FIGS. 7E-7F. The narrow bar was 3-4 μm wide for both top and bottom electrodes. The device area was measured individually under an optical microscope using a 150× objective. The detailed device fabrication process is described below.

The top electrodes were first defined using a standard photolithography process followed by e-beam evaporation of 40 nm Au on a $SiO_2$/Si wafer. After dissolving the photoresist in Microposit Remover 1165 and rinsing with acetone and IPA, the wafer was soaked with pre-patterned electrodes into a heptane solution of trichloro(1H,1H,2H,2H-perfluorooctyl)silane(TCFS)(1 μL/mL) for 3 mins. TCFS molecules advantageously modify the wettability of the wafer to be more hydrophobic. PMMA A8 was then spin-coated onto the wafer (2800 rpm, 60 s) and heated at 180° C. for 1 min on a heating plate. A TRT was used to peel off the PMMA layer and electrodes from the wafer in the presence of deionized water. Bottom electrodes were fabricated by using standard photolithography process and e-beam evaporation of 1 nm Cr/40 nm Au on a fused silica substrate. Lift-off of the photoresist was then carried out in a Microposit Remover 1165. The resulting bottom electrodes were rinsed with acetone and isopropyl alcohol before use.

The devices may also be stacked. The TRT/PMMA/electrodes stack was mounted onto the top pressor of a vacuum stacking apparatus. The same process that generated 2DP/$MoS_2$ van der Waals heterostructures was used here to make the device arrays with the top electrode. After the desired device structure was achieved (i.e., layer number and composition), the TRT was released and the stack (PMMA/electrodes/film) on the substrate was saved before moving to the next step.

Next, alignment of the bottom electrodes was carried out. A transparent PDMS film with rigid backside support (GelPak, X4) was attached onto the stack resulting from the previous step. The PMMA/electrodes/film stack was then detached from the substrate onto the supported PDMS film. The resulting PDMS/PMMA/electrodes/film stack was mounted on a glass slide. The bottom electrode was then taped onto the base stage of the alignment apparatus, which was capable of X-axis and Y-axis motion and rotation. After carefully aligning the top and bottom electrodes under an optical microscope, the two were slowly brought into contact by lowering the Z-axis motion actuator clamping the glass slide. The base stage was then gradually heated to 120° C. to release the PMMA/electrodes/film from the PDMS support. The resulting stack on substrate was further heated at 180° C. on a hot plate for 2 mins before removing the PMMA with chloroform.

Capacitance measurements were carried out on a Keysight B1500A semiconductor device analyzer with a capacitance measurement module and a Signitone probe station under ambient conditions at room temperature. The measurements were conducted in a two-probe geometry with a 30 mV excitation voltage at a frequency of 5 MHz. The capacitance value of each device geometry was the average of ten capacitor devices measured on the same chip with a DC bias scanning from 0 to 9 mV at 1 mV step. Arrays of electrical capacitors fabricated using vdW heterostructures of 2DP and $MoS_2$ as described above are seen in FIGS. 7E-7F. Each device in an array consists of two gold electrodes sandwiching a vdW heterostructure, which serves as a dielectric at a low bias.

Figure 7G:
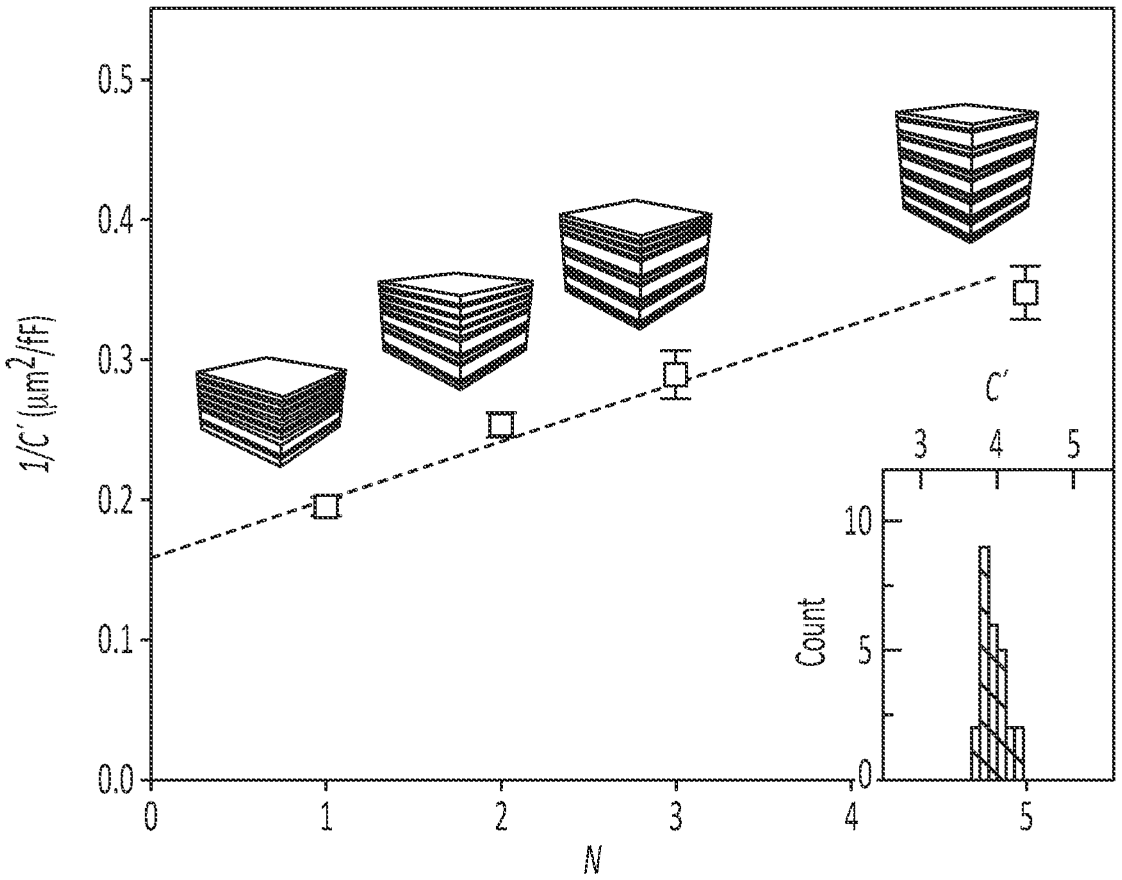
FIG. 7G is a plot of the reciprocal of area-normalized capacitance, 1/C', as a function of the number of stacked layers measured for a series of heterostructures, $(MoS_2/2DP\text{-}II)_N(MoS_2)_{6-N}$, where N monolayers of 2DP-II thin films were inserted in between $MoS_2$ layers of a 6-layer $MoS_2$ stack, according to one set of embodiments.

FIG. 7G is a plot of the reciprocal of area-normalized capacitance (1/C'), as a function of N. The results in FIG. 7G were measured from a series of heterostructures, $(MoS2/2DP\text{-}II)_N(MoS_2)_{6\text{-}N}$,where N monolayers of 2DP-II films were inserted in between $MoS_2$ layers of a 6-layer $MoS_2$ stack, each of which is shown above the applicable data point in FIG. 7G. Thus, the dielectric thickness and the capacitance were directly tuned by varying the layer number of monolayer 2DP-II. The measured inverse capacitance 1/C' (where C' is the area-normalized capacitance) linearly increased as N increased from 1 to 5. Using the classical capacitor model, the dielectric constants of 2DP-II(4.1) and $MoS_2$(2.7) were extracted, and were agreement with known values. The measured capacitance from an array of devices exhibits a narrow distribution, as seen in the lower inset in FIG. 7G, suggesting spatial uniformity of the hybrid heterostructures.

EXAMPLE 14

The following example describes laser patterning of monolayer 2DPs. The laser patterning techniques described in this example may be applied to the thin films prepared using methods and system described herein, including those described in Examples 1-4.

A Keyence MD-T1010W laser marker equipped with a 532 nm pulsed laser was used to pattern 2DPs on various substrates and on water. After the growth of a monolayer 2DP (e.g., 2DP-I, 2DP-2, etc.) at a pentane/water interface, pentane was allowed to evaporate and the laser was focused at the water surface. After patterning, the patterned film was transferred to a substrate that was pre-positioned in the aqueous phase. This process was used to generate the patterned film on the water surface. To stack 2 layers of patterned 2DP films, the 2DP was first patterned and transferred onto a transparent fused silica substrate. Then, another 2DP was patterned with a 60° off-set angle and transferred onto the same substrate.

Figure 8A:
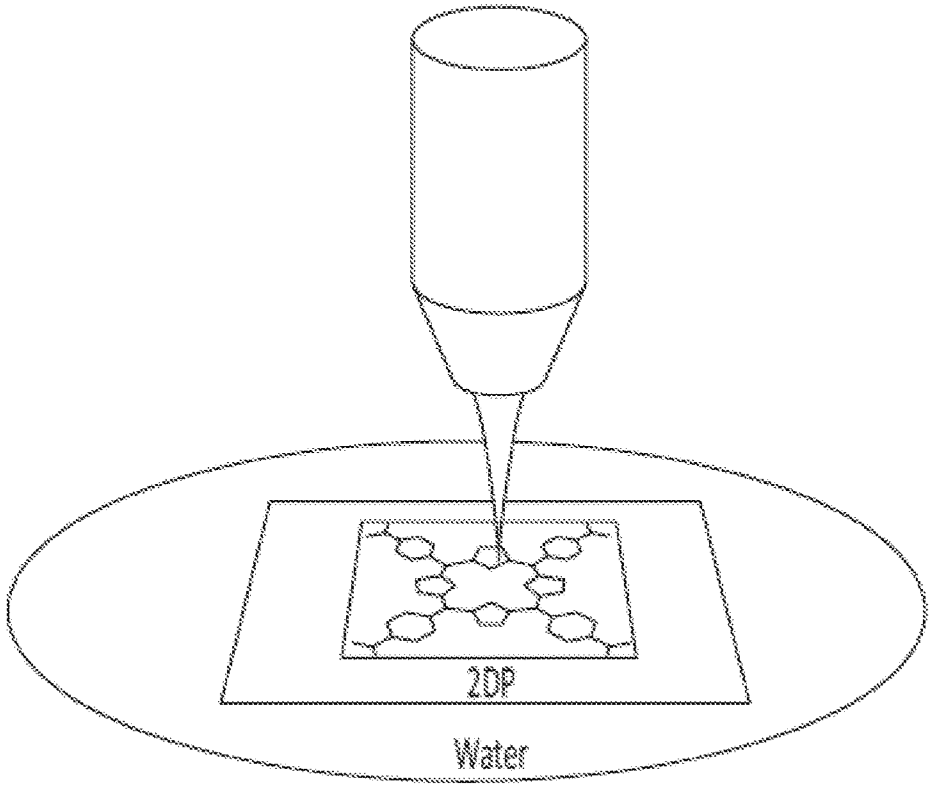
FIG. 8A shows a schematic of patterning of 2DP films on a water surface using a 532 nm green laser, according to some embodiments.

Patterning could also be provided on solid substrates. After transfer onto a solid substrate, a monolayer 2DP film was patterned using the laser marker. This is illustrated schematically in FIG. 8A, which shows the patterning of a 2DP film on the water surface using a 532 nm green laser. The laser power was determined so that the irradiated 2DP was completely removed.

The film in FIG. 7B was patterned on a fused silica substrate using this process.

Figure 8B:
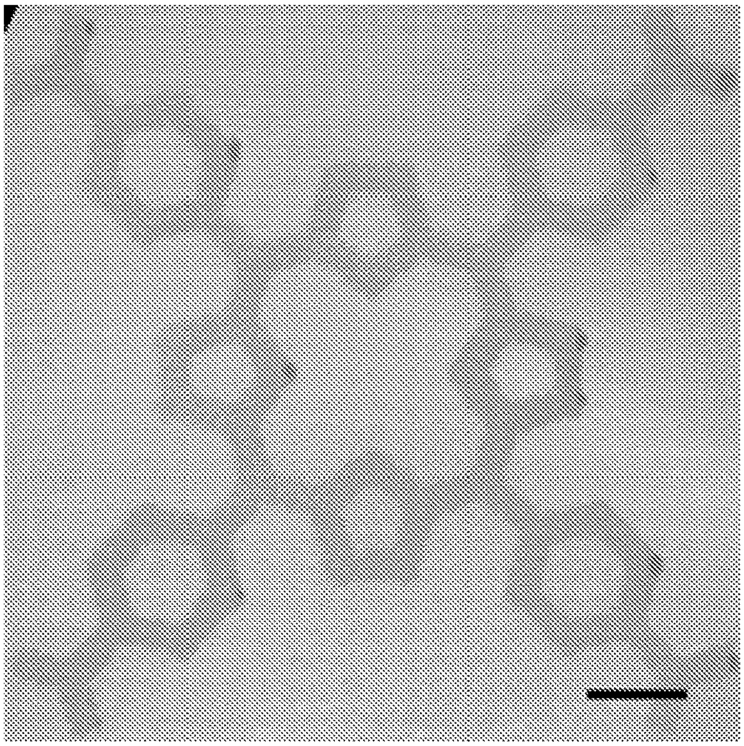
FIG. 8B shows an optical reflection image of a laser-patterned 2DP-I thin film at a wavelength of 420 nm, according to one embodiment.

FIG. 8B is an optical reflection image of laser-patterned 2DP-I at a wavelength of 420 nm.

Figure 8C:
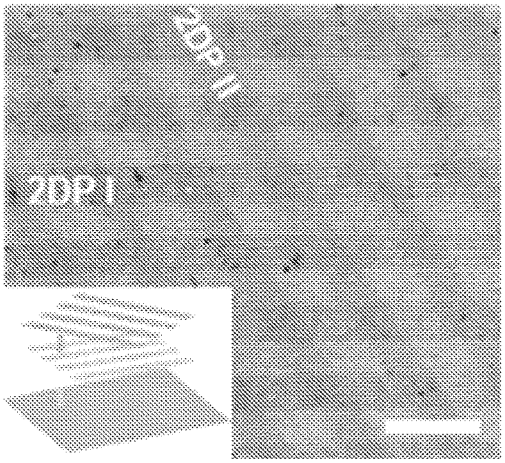
FIG. 8C shows images of overlapped layers, a first layer comprising 2DP-I stripes and a second layer comprising 2DP-II stripes, produced by stacking laser patterned layers, with a scale bar of 500 μm, according to one set of embodiments.
Figure 8D:
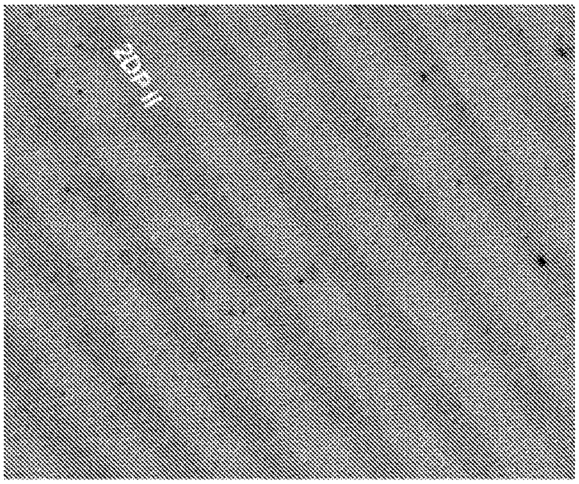
FIGS. 8D-8E show optical transmission images of the multi-layer material of FIG. 8C.
Figure 8E:
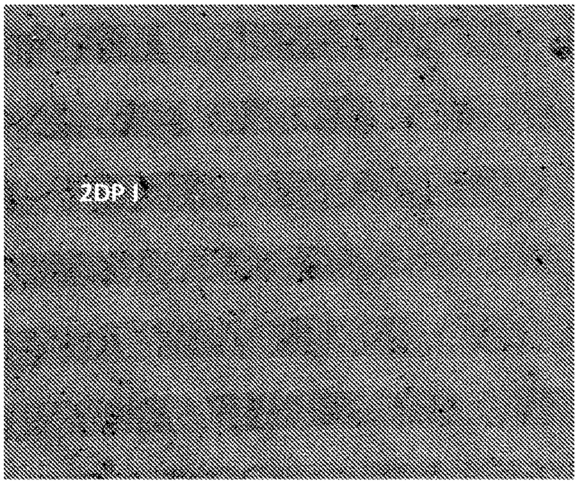

FIG. 8C shows multiple patterned layers overlapped with each other. To stack two layers of patterned 2DP films, 2DP-I was first patterned and transferred onto a transparent fused silica substrate. Then, 2DP-II was patterned with a 60° off-set angle and transferred onto the same substrate. FIGS. 8D-8E are additional images of the patterned multi-layer material shown in FIG. 8C.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims and specification to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:

delivering a first reagent to a first location of an interface between a first liquid phase and a second liquid phase, such that the first reagent does not dissolve within the first liquid phase and the first reagent reacts to form a first portion of a thin film having a first composition via interaction with a second reagent; and delivering a third reagent to the interface at a second location laterally displaced from the first location, the third reagent forming a second portion of the thin film having a second composition different from the first composition.

2. The method of claim 1, wherein the second reagent is a reactant that reacts with the first reagent to form the thin film.

3. The method of claim 1, wherein the second reagent is a catalyst that catalyzes reaction of the first reagent to form the thin film.

4. The method of claim 1, wherein delivering the first reagent to the first location of the interface between the first liquid phase and the second liquid phase comprises injecting a liquid carrier comprising the first reagent into the first liquid phase.

5. The method of claim 4, wherein the liquid carrier is miscible in at least one of the first liquid phase and the second liquid phase.

6. The method of claim 4, wherein the liquid carrier comprising the first reagent is delivered to the interface via laminar flow.

7. The method of claim 1, wherein neither of the first liquid phase and the second liquid phase are soluble in each other in an amount of more than 300 mg/mL at 20° C.

8. The method of claim 1, wherein a solubility of the first reagent in the first liquid phase is less than or equal to 0.1 mg/mL at 20° C.

9. The method of claim 8, wherein a solubility of the first reagent in the second liquid phase is less than or equal to 0.1 mg/mL at 20° C.

10. The method of claim 1, wherein the thin film is a monolayer.

11. The method of claim 1, wherein the thin film is a 2-dimensional material.

12. The method of claim 1, wherein the thin film has a minimum lateral dimension of at least 5 centimeters.

13. The method of claim 1, wherein the thin film is a self-supporting thin film.

14. The method of claim 1, wherein the thin film is continuous.

15. The method of claim 1, wherein the thin film is monocrystalline or polycrystalline.

16. The method of claim 1, wherein the first reagent is a monomer that reacts to form a polymeric thin film.

17. The method of claim 1, wherein the thin film comprises graphene.

18. The method of claim 1, wherein the first reagent is delivered to the interface via a conduit that extends into the first liquid phase.

19. The method of claim 18, wherein a direction of flow of the delivered reagent at the outlet of the conduit is within 15° of parallel to the interface.

20. The method of claim 1, further comprising providing a substrate disposed in one or both of the first and second liquid phases in a vessel containing the first and second liquid phases, and transferring the thin film onto the substrate by removing the one or both of the first and second liquid phases from the vessel.

21. The method of claim 1, wherein the first liquid phase is above the second liquid phase and has a smaller relative density than the second liquid phase.

* * * * *